US012469673B2

United States Patent
de Boer et al.

(10) Patent No.: US 12,469,673 B2
(45) Date of Patent: Nov. 11, 2025

(54) MEMS PLATFORM FOR THIN FILM NANOMECHANICS CHARACTERIZATION

(71) Applicant: Carnegie Mellon University, Pittsburgh, PA (US)

(72) Inventors: Maarten de Boer, Pittsburgh, PA (US); Longchang Ni, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 529 days.

(21) Appl. No.: 18/082,543

(22) Filed: Dec. 15, 2022

(65) Prior Publication Data
US 2023/0187167 A1 Jun. 15, 2023

Related U.S. Application Data

(60) Provisional application No. 63/289,775, filed on Dec. 15, 2021.

(51) Int. Cl.
H01J 37/20 (2006.01)
B81B 7/00 (2006.01)

(52) U.S. Cl.
CPC ............ *H01J 37/20* (2013.01); *B81B 7/0003* (2013.01); *H01J 2237/20221* (2013.01); *H01J 2237/20264* (2013.01); *H01J 2237/20271* (2013.01); *H01J 2237/3151* (2013.01)

(58) Field of Classification Search
CPC ............ H01J 37/20; H01J 2237/20271; H01J 2237/20221; H01J 2237/20264; H01J 2237/3151; B81C 1/00666; H01H 2001/0089
See application file for complete search history.

(56) References Cited

U.S. PATENT DOCUMENTS

| | | | |
|---|---|---|---|
| 2005/0239231 A1* | 10/2005 | Przybyla | B81C 1/00801 438/48 |
| 2010/0252403 A1* | 10/2010 | Hays | H01H 59/0009 200/181 |
| 2023/0271822 A1* | 8/2023 | de Boer | B81B 3/0021 257/415 |

FOREIGN PATENT DOCUMENTS

WO    WO 2022006465    1/2022

OTHER PUBLICATIONS

Legros, "In situ mechanical TEM: Seeing and measuring under stress with electrons," Comptes Rendus Physique, Feb. 1, 2014, 15(2-3):224-40.
Ni et al., "Self-Actuating Isothermal Nanomechanical Test Platform for Tensile Creep Measurement of Freestanding Thin Films," Journal of Microelectromechanical Systems, Dec. 6, 2021, 31(1):167-75.

* cited by examiner

*Primary Examiner* — Michael J Logie
*Assistant Examiner* — Hsien C Tsai
(74) *Attorney, Agent, or Firm* — Fish & Richardson P.C.

(57) ABSTRACT

A micro-electromechanical system (MEMS) device includes a silicon substrate; and a Tantalum (Ta) layer comprising a first portion and a second portion, a first portion being suspended over the silicon substrate and configured to move relative to the silicon substrate, and the second portion of the structure being coupled to the silicon substrate and fixed in place relative to the silicon substrate.

20 Claims, 15 Drawing Sheets

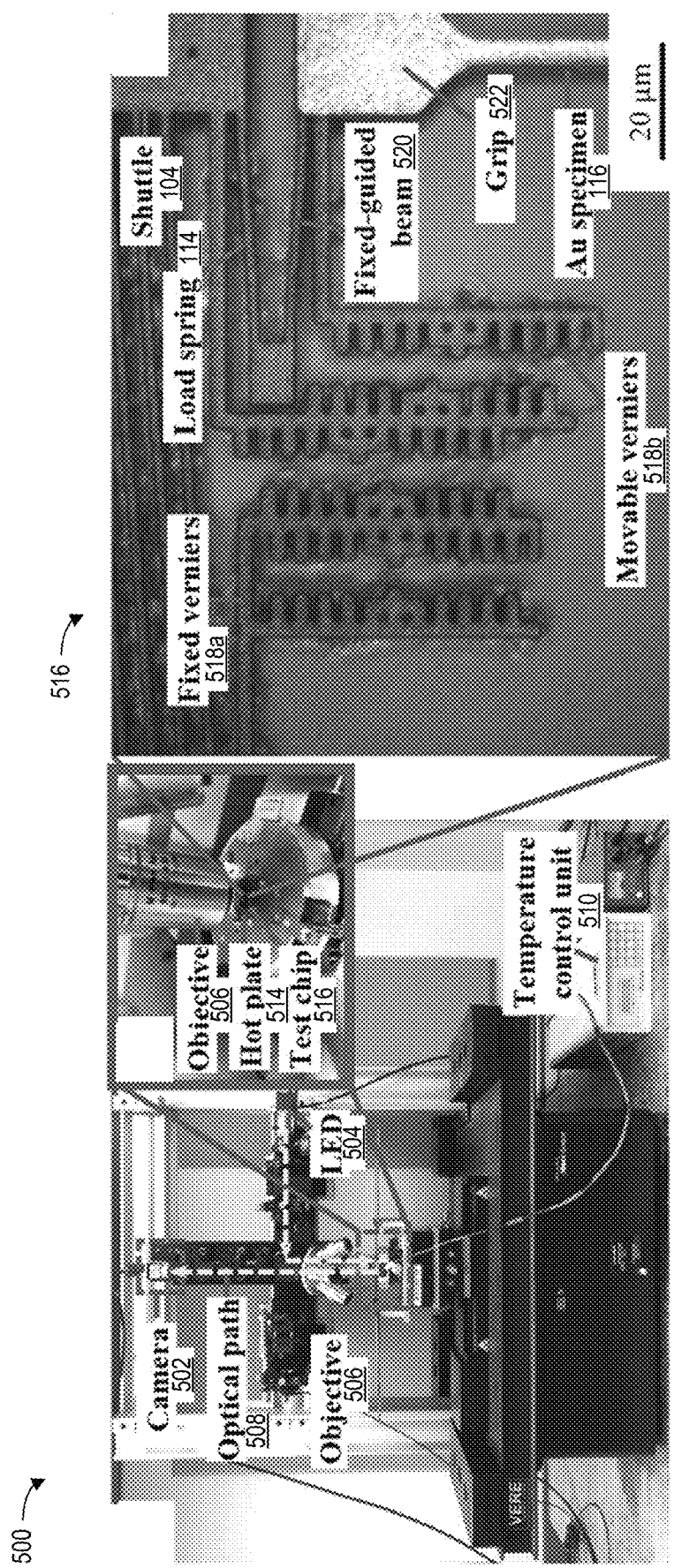

MEMS PLATFORM FOR THIN FILM NANOMECHANICS CHARACTERIZATION

CLAIM OF PRIORITY

This application claims priority under 35 U.S.C. § 119(e) to U.S. Provisional No. 63/289,775, filed on Dec. 15, 2021, the entire contents of which are hereby incorporated by reference.

GOVERNMENT SUPPORT CLAUSE

This invention was made with United States government support under 1635332 and 1854702 awarded by the National Science Foundation. The U.S. government has certain rights in the invention.

TECHNICAL FIELD

This disclosure relates generally to micro-electromechanical systems (MEMS) as platforms for tensile creep measurement of thin films. Specifically, this disclosure relates to MEMS including tantalum (Ta) metal as a structural material for one or more elements of the MEMS.

BACKGROUND

MEMS include microscopic devices, particularly those with moving parts. MEMS generally include a central unit that processes data (an integrated circuit chip such as microprocessor) and several components that interact with the surroundings (such as microsensors). Silicon and metals can be used to create MEMS elements. Silicon can exhibit a very high degree of reliability. Metals are of interest when high conductivity or reflectivity or other properties are required in MEMS applications. The properties of metal alloys are of great interest for structural applications at many scales up to meters or more. Metals can be deposited by electroplating, evaporation, and sputtering processes.

Thin films are used for increasing performance and reducing cost and energy consumption various electronics, memory, displays, micro- and nanomachining, biosensing, photovoltaics, and batteries. Thin films provide critical functions in decorative, optical and protective coatings. The mechanical behavior of thin films, including stiffness, strength, residual stress, fracture toughness, fatigue, creep, and adhesion, when subject to various temperature and environments, are closely related to performance of devices employing them. In a variety of applications, thin film optical properties, when subject to stress, affect device performance. Measuring and understanding these properties is useful, as is development of an instrument in which such properties can simultaneously all be measured, quantified statistically, and understood mechanistically.

SUMMARY

This disclosure describes a test platform that is configured to measure attributes of a freestanding thin film, the attributes including a material strength, a strain-rate sensitivity, a fracture toughness, and a fatigue value. The test platform can include a MEMS device. The MEMS device can include nanocrystalline refractory metal tantalum (Ta) as a structural material. More specifically, the Ta includes ultrafine grained refractory metal in which the grain size is between 100 nanometers (nm) and 1000 nm. The MEMS device can include a thermal actuator (TA). In-situ scanning electron microscopy is conducted during mechanical testing (loading) to obtain data describing texture and texture changes that occur in response to the loading.

This specification describes a fabrication process for the platform that includes making a hole through a substrate that supports the platform. The hole in the substrate allows the in-situ transmission electron microscopy of the thin films while performing the mechanical tests on the thin films. The MEMs fabrication process is extended to enable rapid heating and/or cooling of the tested thin film. Rapid heating and/or cooling improves creep testing and improves testing in a vacuum environment.

The thin film test platform includes a micro-instrument is configured to analyze, for thin films, one or more of complexion transitions, nanocrystalline metal creep, irradiation-induced creep, abnormal grain growth, grain rotation, dislocation motion, dislocation multiplication and dislocation transmission through grain boundaries.

Generally, a thin film tensile test provides rich information in assessing mechanical properties, but conventional techniques face difficulty with respect to handling and alignment. Generally, a free standing film is built that is attached on one side. The film is carefully gripped, and a user must apply a force on the opposite side without damaging the film and simultaneously achieve a high alignment over multiple degrees of freedom. Other challenges in thin film mechanical property measurement are specimen preparation, limited precision, a small temperature range and low test throughput.

The test platform is configured to overcome these challenges and provides one or more of the following advantages. The platform is configured for a micro tensile test. A thermal actuator (TA) on a first side provides force that is transmitted through a load spring to a thin film tensile bar. The test platform can be batch fabricated using a micromachined structural material (such as tantalum, TA). The tensile bar material can be virtually any metal, metal alloy or ceramic. The thickness of the tensile bar material ranges from 50 to 1000 nm. A nanofabrication process flow achieves strong gripping and near perfect alignment. Specimen handling is simplified in comparison with conventional techniques because only a relatively much larger chip is manipulated during testing. For example, one method to provide force is simple to pass current through the TA legs while measuring deflections.

The platform is configured to satisfy several testing attributes that enable more thorough strain testing of micrometer sized metal specimens. The platform attributes include a uniaxial tensile specimen with routine placement and accurate alignment. The platform is configured for batch fabrication including a full surface micromachining manufacturing process flow. The platform is configured for simplified handling of delicate (less than 0.5 micrometer (μm) thick) specimens for testing. The platform is configured to cancel drift in measurements. The platform is configured for strong gripping of the specimen. The platform is configured for on-chip self-actuation. The platform is configured for isothermal test conditions. The platform enables a large strain range for testing, as described herein. The platform enables a process flow for testing a wide variety of metals. The platform enables testing using a wide variety of temperatures in an expanded temperature range (up to 800° C., and down to temperatures below 0° C.). These advantages and how they are each enabled are subsequently discussed in detail.

The one or more advantages previously described can be enabled by one or more embodiments.

In a general aspect, a micro-electromechanical system (MEMS) test platform includes a substrate; a Tantalum (Ta) layer comprising a movable structure and a fixed portion, the movable structure being suspended over the substrate and configured to move relative to the substrate, and the fixed portion of the Ta layer being coupled to the substrate and fixed in place relative to the substrate; and a test specimen comprising a first portion coupled to the movable structure and a second portion coupled to the fixed portion of the Ta layer, the movable structure configured apply a force to the test specimen when the of the Ta layer structure moves relative to the substrate.

In some implementations, the force comprises a strain force on the test specimen.

In some implementations, MEMS test platform includes a sacrificial layer between the substrate and the Tantalum layer, wherein a first portion of the sacrificial layer is etched away to release the first portion from the substrate, and wherein a second portion of the sacrificial layer remains and couples the substrate to the Tantalum layer.

In some implementations, the sacrificial layer comprises Aluminum Nitride (AlN), Copper (Cu), or Silicon Oxide ($SiO_2$).

In some implementations, the first portion comprises etched Tantalum, and wherein a sidewall profile of the etched Tantalum comprises approximately zero lateral etch or an etch angle between 85-90° C.

In some implementations, the movable structure includes a plurality of legs extending from a first side of the substrate or a second side of the substrate to connect at a shuttle, the plurality of legs being coupled to the substrate at the first and second sides, wherein the plurality of legs are configured to support an in-plane movement of the shuttle.

In some implementations, at least one leg of the plurality of legs are each between 1-2.5 micrometers ($\mu$ms) thick, and wherein each of the plurality of legs have an approximately equal thickness.

In some implementations, the movable structure comprises a load spring in series with the shuttle, the load spring configured to provide an approximately constant load condition on the test specimen when the movable structure is not actuated.

In some implementations, the movable structure is actuated by application of an electrical current through the movable structure and the test specimen.

In some implementations, the movable structure is actuated by heating the movable structure and the test specimen.

In some implementations, the movable structure is configured to move up to 5, 10, 15, or 20 $\mu$m relative to the substrate responsive to an electrical or thermal input.

In some implementations, an isotropic release etching of a sacrificial layer comprising AlN is between 60° C.-90° C.

In some implementations, the Tantalum layer comprises $\alpha$-Tantalum.

In some implementations, the test specimen comprises gold.

In some implementations, the test specimen comprises a ceramic.

In some implementations, the movable structure is heatable up to 800° C. and coolable to −150° C., the approximated Ta ductile to brittle transition temperature, to control the force on the test specimen.

In some implementations, the test specimen comprises a metal or ceramic, wherein the test specimen does not include Ti, V, Nb, W and Mo or Al.

In some implementations, MEMS test platform includes an atomic layer deposition of $Al_2O_3$ configured to provide oxidation resistance.

In some implementations, MEMS test platform includes comprising a window in the substrate, the window configured to enable in-situ transmission electron microscopy (TEM) of the test specimen during actuation of the movable structure.

In some implementations, MEMS test platform includes a heating structure formed from the Ta layer, the heating structure coupled to the movable structure for actuation of the movable structure.

In some implementations, a silicon wafer includes at least 1000 instances of the MEMS test platform configured for batch fabrication, wherein each instance of the MEMS test platform is removable for performing testing of a corresponding instance of the test specimen.

The details of one or more implementations are set forth in the accompanying drawings and the description below. Other features and advantages will be apparent from the description and drawings, and from the claims.

BRIEF DESCRIPTION OF DRAWINGS

FIG. 5A illustrates an example test environment using the MEMS platform.

FIG. 5B illustrates example images of the MEMS platform of FIG. 5A.

Like reference symbols in the various drawings indicate like elements.

DETAILED DESCRIPTION

Figure 1A:
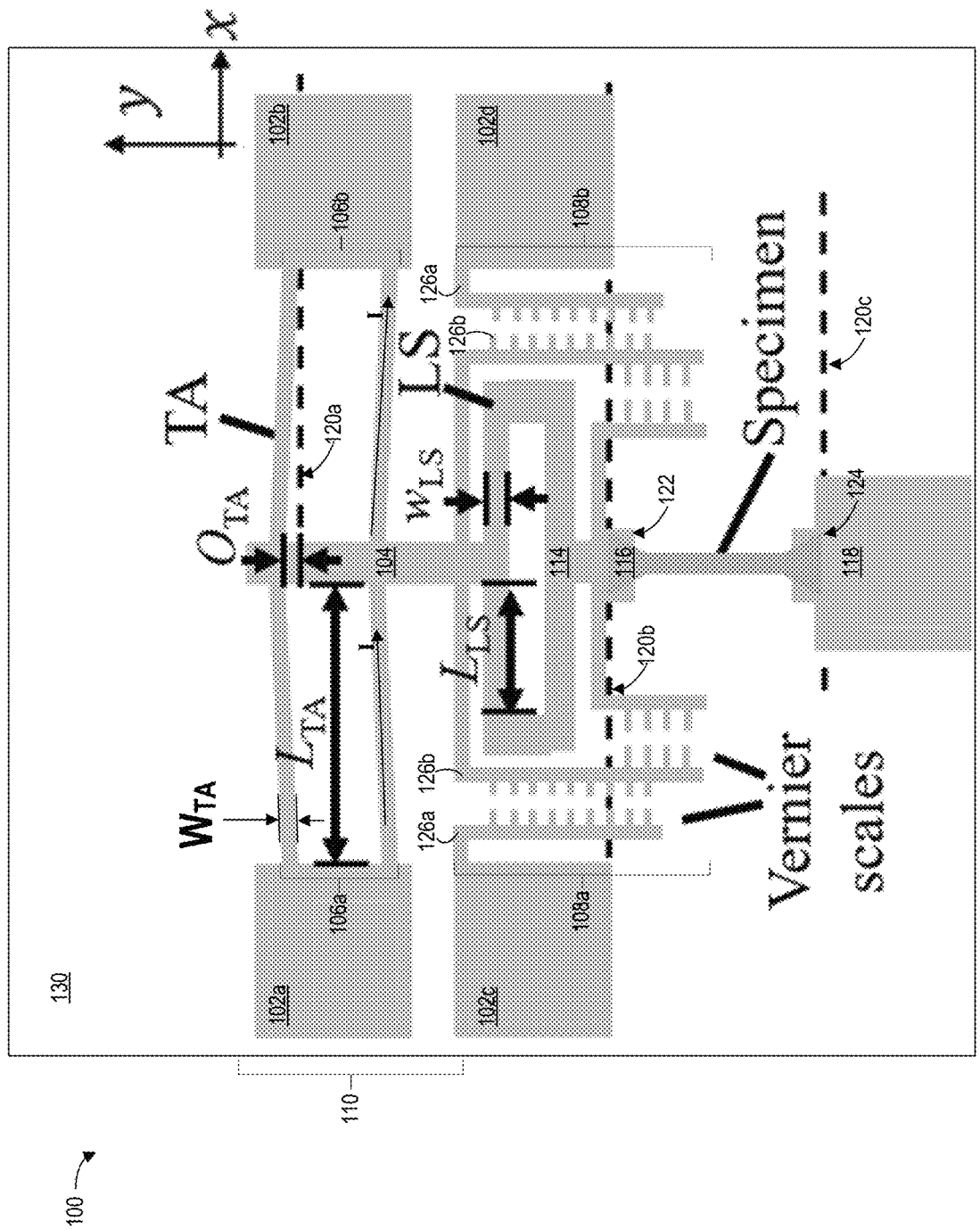
FIG. 1A illustrates an example of a MEMS platform.

FIG. 1A shows a top view of an example test platform 100 for strain testing a specimen 116. The test platform 100 includes a MEMS device that includes a V-shaped thermal actuator (TA) with a Tantalum (Ta) based MEMS structure 110. The MEMS structure 110 includes a plurality of legs 106a and legs 106b that together form a plurality of leg pairs. The legs 106a-b are coupled to a substrate (e.g., a silicon substrate) at a first portion 102a (a pad) of a Tantalum layer and a second portion 102b (pad) of the Tantalum layer. The legs are configured to move a central shuttle 104 in response to input actuation signals (e.g., changes in ambient temperature or by Joule heating, etc.). A TA is configured to use Ta because Ta has a higher coefficient of thermal expansion (CTE) than silicon. The CTE discrepancy enables actuation of the Ta structure when the structure is heated. This actuation mechanism is different from polysilicon thermal actuators.

Vernier scales 108a-b are included on the MEMS device 100 to measure a change in position of the shuttle and thus actuation of the TA. Additional pads 102c and 102d anchor portions of Vernier scales 108a-b to the substrate. The test platform 100 is configured for in-plane deflection of the shuttle 104 of a distance up to 5-10 μm once the sacrificial layer has been removed. Distance $O_{TA}$ represents an in-plane deflection that results from an initial layout geometry on the mask. The change from the initial $O_{TA}$ represents in-plane deflection due to actuation.

The processes described herein for performing etching of the Ta layer and for controlling, reducing or eliminating residual stresses of the Ta layer enable the Ta layer to form microstructures on the silicon substrate for forming the test platform 100.

Additionally, as described herein, the low-temperature release process for the Ta layer during etching of Cu or AlN sacrificial layers enables the Ta microstructures to be formed directly on fabricated CMOS structures, as the CMOS structures can tolerate temperatures up ~300° C., much more than the mild temperatures) of the release processes described herein for AlN or Cu sacrificial layers (≤100° C.).

Residual stress in the TA 110 is another way to control actuation. For example, if the legs 106a-b are under compression during processing, the legs 106a-b expand upon release. This release enables a third actuation mechanism, in addition to joule heating and temperature changes.

The legs 106a-b have a projected length marked $L_{TA}$ and a width marked $W_{TA}$. The thickness of the legs 106a-b is determined based on the thickness of the Ta layer that is included in the MEMS device 100. The thickness can be, for example, about 1 μm to 2.5 μm. Other thickness can be achieved, as subsequently described, depending on the application or particular MEMS device. In some implementations, thicker Ta layers (e.g., >2.5 μm) improves sensor performance for accelerometers, and gyroscopes. Thicker Ta layers (e.g., >2.5 μm) can perform better than thinner Ta layers for increasing force in thermal actuators. A thicker Ta layer (e.g., >2.5 μm) makes fabrication easier for achieving flat structures such as comb fingers, which are used in accelerometers and gyroscopes. This is because beam moment of inertia scales with thickness to the third power. For a same stress gradient (e.g., residual stress variation with thickness), a response curvature will decrease. Thicknesses of 10-25 μm are achievable. The legs can have a spacing of less than 5 μm.

Though a particular geometry is described herein for platform 100, this geometry is an example of one particular MEMS structure formed from Ta. A wide variety of geometries can be achieved using the processes for forming platform 100 as described herein.

The platform 100 of FIG. 1A is shown before isothermal self-actuation. The horizontal dashed lines 120a, 120b, 120c serve as references to indicate displacements. All areas are freestanding except the pads 102a, 102b, 102c, 102d, and 118. One method to provide force is simply to pass current (marked with arrows labeled 1) through the TA legs while measuring deflections, or changing the temperature of the legs 106a-b.

The platform 100 includes a chevron-type thermal actuator (TA), a load spring (LS) 114, a tensile specimen 116, and Vernier scales 108a-b. The specimen 116 is gripped by adhesion to an area of structural material at region 122 and to another pad 118 at region 124. The pad 118 is fixed in place to the substrate with respect to pads 102a-d.

The TA 110 of platform 100 is constructed with a structural material with a CTE greater than that of the silicon substrate, in contrast with conventional polycrystalline silicon TAs. As the temperature rises, the TA 110 expands and moves in the +y direction due to a CTE mismatch with the silicon substrate (shown in FIG. 1B, subsequently described). The platform 100 applies a tensile force to the LS 114 and tested specimen 116. The displacements $\Delta O_{TA}$ (change in $O_{TA}$) are determined by measuring the Vernier scales 108a-b. The Vernier scales 108a-b include fixed portions 126a that are fixed to pads 102c-d and static relative to the substrate 130. These are compared to Vernier scale portions 126b that are coupled to the load spring 114 that is movable relative to the substrate 130. The relative displacements are exaggerated in FIG. 1B for illustrative purposes. Besides providing self-actuation, a problem of specimen 116 temperature non-uniformity is solved without any loss of force.

The platform 100 is shown in a relaxed, or non-actuated state in FIG. 1A in the case where the residual stress is nominally zero or absent. The platform grips specimen 116 at point 122. The specimen is affixed to another pad 118 at point 124. The pad 118 is not directly coupled to the TA 110 except through the specimen 116. When the TA is actuated (e.g., using a current I), the legs 106a-b move in the +y direction by a displacement $O_{TA}$. The displacement is affected by the lengths $L_{TA}$ of the legs 106a-b. The lengths of the legs 106a-b can be fabricated to different sizes for testing different specimens 116 under different forces.

The load spring 114 is a mechanical spring that is configured to provide a load on the TA 110. The load ensures that the TA 110 is in a known, static position prior to actuation. The load spring 114 transfers force from the TA 110 to the specimen 116 when the TA is actuated. The load spring pulls the specimen 116 to create a strain force in the specimen, which is stretched between the pad 118 and the load spring 114.

Members forming the load spring has a length LLS and a width $w_{LS}$, shown in FIG. 1A. In some implementations, the values of LLS are between 10 to 100 micrometers (μm). In some implementations, the values of $w_{LS}$ are between 1 to 20 μm. The load spring is a structure consisting of four fixed-guided beams.

Figure 1B:
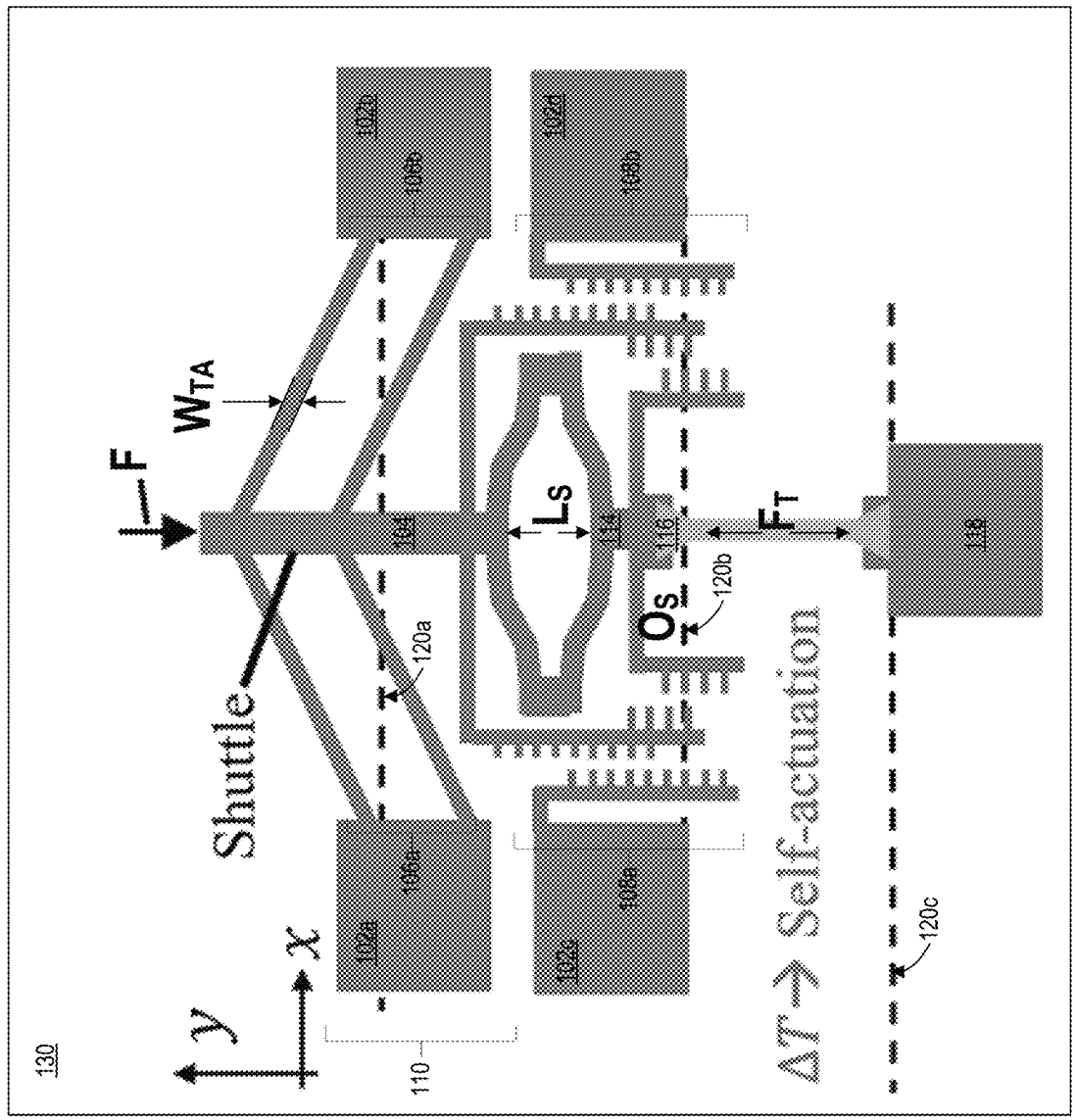
FIG. 1B illustrates the MEMS platform of FIG. 1A in a second position.

FIG. 1B shows the platform 100 in an actuated state. A tensile force FT is applied to the specimen 116. The load spring 114 is extended by a length, as shown by $L_S$. The shuttle 104 is displaced to extend the load spring 114 and cause the force FT on the specimen. Lines 120a-c show relative displacement at various areas in the platform 100 for the actuated state, in comparison to the relaxed state of the platform in FIG. 1A.

Generally, a TA 110 coefficient of thermal expansion (CTE, α) is larger than that of the substrate 130. Either compressive residual stress in the TA 110 legs 106a-b or an increase of temperature causes a positive self-actuation. Effects of compressive stress and temperature increase on displacement superpose. In contrast, tensile residual stress in the legs 106a-b or a decrease in temperature cause a negative self-actuation. Zero compressive stress and zero temperature rise is called zero self-actuation.

Figure 2:
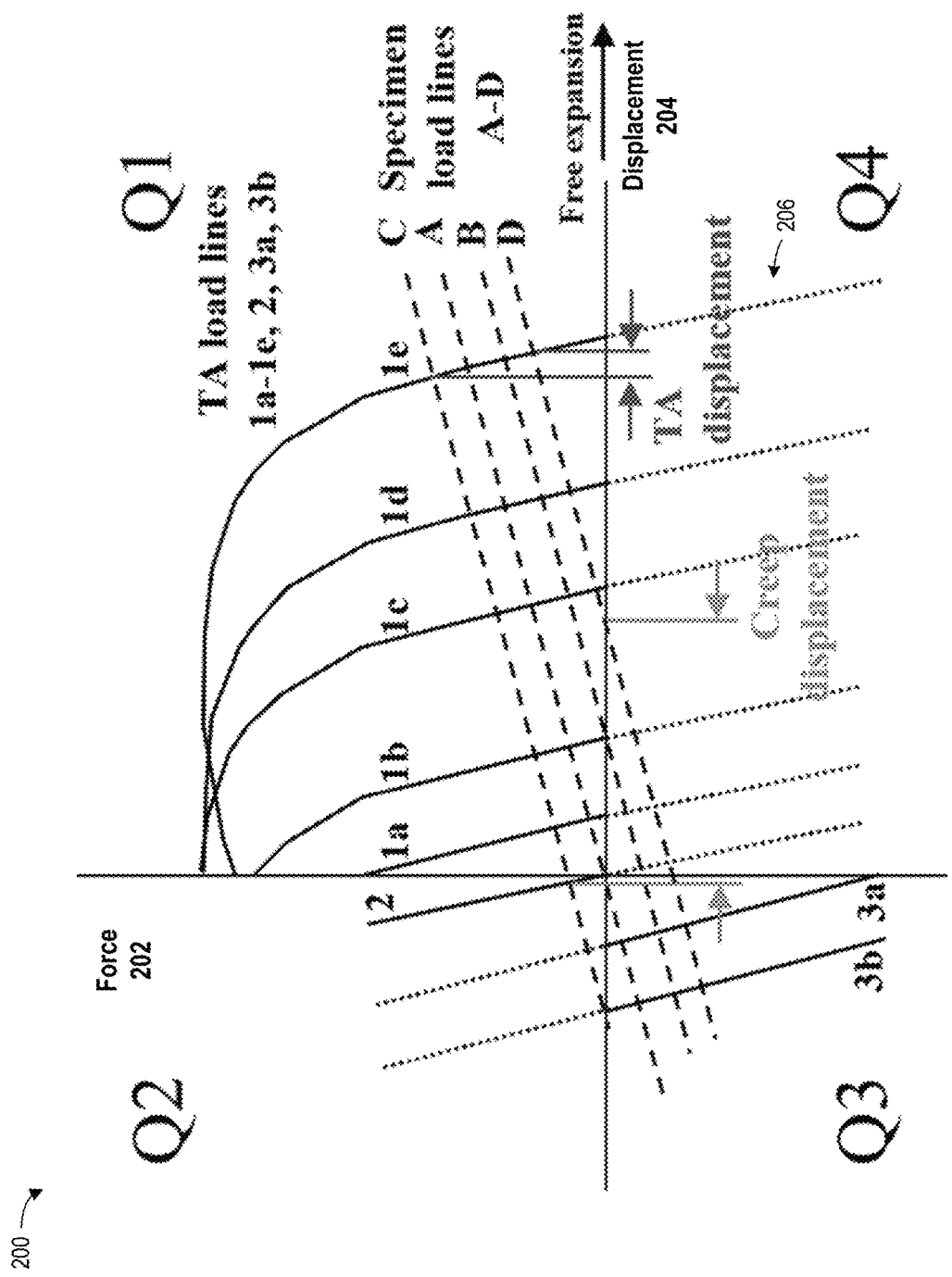
FIG. 2 illustrates a graph showing displacements by the MEMS platform of FIGS. 1A-1B.

The intersection of load lines as shown in FIG. 2 defines the operating point of the system. If the tensile bar possesses zero residual stress, its load line is defined by its axial stiffness, and corresponds to dashed line A. The residual stress in the tensile bar is in general different from that in the TA legs. The load lines 1a-1e and 2 represent TA load lines. Different lines correspond to different residual stresses in the tantalum material and different temperatures applied to the system. If for example there is a small compressive residual stress in the TA legs, the load line may be described by Line Ta. Once fabricated, the residual stress does not change. Actuation is induced then by increasing temperature, which then causes the load line to move to 1b, 1c, 1d, 1e for monotonically increasing temperatures. The shuttle, the load spring and the tensile bar are in series, and therefore all carry the same load. The operating point is determined by measuring the load spring displacement. The tensile bar 104 is generally much stiffer than the load spring 114, because the former is stretched axially while the latter deflects by bending. Most of the displacement in the specimen load line ($L_S$) is by the load spring 114. Of these three components, the load spring is the most compliant. Therefore the load spring 114 configuration enables a large creep displacement. The soft load spring 114 enables the advantage of slow stress relaxation on the specimen 116 and a constant load condition to be approached. A similar method employed at the macroscale generates steady state creep values.

FIG. 2 includes a graph 200 that illustrates demonstrates possible load states of the platform 100 of FIGS. 1A-1B. Cartesian quadrants are labeled Q1, Q2, Q3, and Q4. For any state of the platform 100, an axial force F on the specimen 116 can be determined by measuring the displacement across the load spring 114, which is used on combination with a known spring constant of the load spring 114. The forces 202 shown in graph 200 are measured at the shuttle 104 (labeled F in FIG. 1B). The displacements 204 shown in graph 200 for the TA load lines are measured at the legs 106a-b and shown as $O_{TA}$ in FIG. 1A. The displacements 204 shown in graph 200 for the creep displacement at the specimen load lines are shown as Os in FIG. 1B.

At the origin of graph 200, the TA legs 106a-b and the specimen 116 have zero residual strain. At room temperature (RT), the load point is at the origin graph 200. This is the relaxed state of the platform 100 indicated in FIG. 1A. At quadrant Q1, the lines labeled 1a, 1b, 1c, 1d and 1e show that, for fixed positive self-actuation in the absence of a specimen, the TA freely expands at zero TA force, giving rise to positive displacement along the displacement axis of graph 200. The TA load lines result from further application of an external force to the self-actuated TA 110. When an external force is applied to reduce the TA displacement, the TA 110 opposes the force as shown by lines 1a-1e, each of which is a line representing a fixed positive actuation of the TA 110 of the platform 100. The force corresponds to a force F applied in the y direction as indicated in FIG. 1B. This is a positive force represented in graph 200. This force causes a tension in the specimen 116. The outermost TA load line 1e, when the external force is first applied, the TA legs are axially compressed, giving rise initially to a steep slope. As the force F increases, the TA legs 106a-b buckle, and the force saturates as the displacement approaches zero.

In some implementations, the specimen is co-fabricated with the platform 110. When an external force is applied by the load spring 114 in series with the tensile bar 104 that has zero residual strain, the intersections of Specimen Load Line A with Lines 1a-1e in Q1 indicate the strain force on the specimen 116. If the specimen is deposited under residual compression, the Specimen Load Line shifts to the right, as represented by Load Line B in the region where it occupies Q1.

In quadrant Q2, for zero self-actuation, the TA Load Line 2 intersects the origin of graph 200. If the tensile specimen is under residual tension, it pulls back the TA, and the specimen load line shifts, as indicated by Line C in graph 200. The intersection of the two load lines is in Q2. If self-actuation increases, for example due to an increase in temperature, the intersection shifts to quadrant Q1.

In quadrant Q3, for negative self-actuation and no external load, the TA free expansion is negative. If an external force is applied in such a way as to cause the TA displacement to approach zero, the TA legs 106a-b are stretched. The TA load line is approximately linear as a stretch force dominates the other forces. TA load lines for two negative self-actuation values are indicated by lines 3a and 3b in graph 200. For such self-actuation, the specimen load line A continues into Q3, representing a specimen 116 under compression. Long thin specimens generally buckle in such situations. As the post-buckling slope for a long thin beam is relatively small, the specimen load line A tilts to parallel the displacement axis 204 at a force determined by the critical Euler buckling force (not shown).

In quadrant Q4, if the specimen residual strain is negative, the specimen 116 expands upon release from the platform 100. The specimen 116 imposes a force in the +y direction on the TA, corresponding to a negative force in graph 200. The TA load line is approximately linear because the TA legs 106a-b are stretched, as indicated by the dotted lines 206 in quadrant Q4. If the specimen 116 does not buckle, the intersection of the load lines is in quadrant Q4 as indicated, for example, by line B. If the specimen 116 does buckle, the load line tilts to parallel the displacement axis 204 at a force determined by the critical Euler buckling force.

Specimen tension, which exists in quadrant Q1, is generally useful for making most mechanical property measurements. Specimen 116 tension is achieved upon release if the TA legs 106a-b are in compression. For example, TA load line 1d is achieved if compression is sufficiently high. The intersections of TA load line 1d with specimen load lines A, B and C all indicate specimen 116 tension. Such states are indicated by the actuated state of the platform 100 in FIG. 1B. Further tension is applied by increasing temperature T. The TA load line shifts from line 1d to load line 1e. If the specimen 116 stress and temperature are sufficiently high, specimen creep takes place under an isothermal condition. For example, if the specimen is in weak residual tension, the platform 100 state may initially be defined by the intersection of lines 1e and line C. Under tension, creep involves specimen 116 elongation. Accordingly, the state of the platform 100 proceeds along load line 1e and eventually reaches load line D. The TA shuttle 104 displacement, as indicated the labeled arrows in graph 200, is positive but relatively small. The specimen creep displacement, as indicated by the labeled arrows in graph 200, is much larger because the TA 110 and load spring 114 are in series. The relatively soft load spring 114 receives a large displacement for compliance with the TA force reduction.

The materials choices and implications for processing those metals is now described. Due to relatively CTE values, metals are preferred as a structural material for TA self-actuation. However, due to relatively small grain sizes (e.g., <1 μm), thin film metals exhibit creep, especially thin film metals having a low melting temperature, Tm. The metals include refractory metals.

In some implementations, W, Mo and Ta are example metals for the TA actuator 110. Of these, Ta has the highest CTE ($\alpha T=5.9 \cdot 10^{-6}$/K), twice that of a silicon substrate ($\alpha Si=2.7 \cdot 10^{-6}$/K). The high Tm, 3290 K, indicates that diffusion and creep is relatively slow at moderate temperatures. This material is amenable to anisotropic etching. The anisotropic etching of 2.5 μm thick Ta minimizes out-of-plane deflections, thereby achieving predictable TA actuation. This is described in further detail in PCT App. Ser. PCT/US2021/040196, filed Jul. 1, 2021 and incorporated herein by reference in entirety.

At 250 MPa, a yield strength of bulk Ta is relatively low. However, when sputtered, nanocrystalline columnar grains form. Hardness can be as high as 12 GPa, as determined by nanoindentation for a grain size of 40 nanometers (nm). The grain size of the Ta can be 160 nm, and the H=7.5 GPa, also determined by nanoindentation. The Ta has a yield strength $\sigma Y$ of approximately 2.5 GPa based on the relationship $\sigma Y=H/3$. When processing Ta, the stable a phase is nucleated. This phase has a body-centered cubic "BCC" crystal structure. Without an appropriate seed layer, tetragonal β-Ta forms. Although with a suitable sputtering pressure the Ta can be deposited under residual compression, the Ta transforms to α-Ta in the vicinity 500° C. The R to a phase transformation is volume reducing, and the TA residual stress undesirably becomes tensile at 500-600 MPa. The residual stress of α-Ta likewise is compressive when sputtered at a proper pressure. Given the high Tm, subsequent processing up to 1000° C. has only a small effect on grain size. Prior to specimen deposition, a post-deposition anneal may be appropriate to further reduce potential Ta creep, which can occur by film densification. Measurements on a test wafer indicate that a 700° C. anneal increases Ta biaxial residual stress by 150 MPa (−97 MPa and +57 MPa before and after anneal, respectively). The as-deposited residual stress is controlled such that a desired as-released stress is achieved in the TA. Unlike the R-phase which always ends up with a high tensile stress after due to phase transformation at ~500° C., α-Ta remains under compression after anneal if the as-deposited compressive stress is sufficiently high.

In some implementations, $SiO_x$ is the sacrificial material. In this example, a buffered hydrofluoric acid release etch injects hydrogen into the Ta lattice. A resulting Ta compression is at the 1 to 2 GPa level. This is so high that upon release the specimen is stretched well beyond its ductility limit. Furthermore, hydrogen can penetrate many metals during upon BHF exposure. AlN serves as a suitable alternative sacrificial material that incurs no detectable residual stress change. The release etchant is KOH, which in addition to Ta is not known to etch many other metals including but limited to Cu, Pt, Au, Mo, W, Ni, Pd and Ag. Alloys, consisting of various arbitrary compositional mixtures of such metals, can also be fabricated and will not be damaged or attacked by KOH.

The Ta TA 110 does not need to be annealed at high temperature after deposition, and Au is chosen as the specimen material. While Au is shown as an example metal, many other metals, metal alloys and even ceramics are possible for testing.

Figure 3:
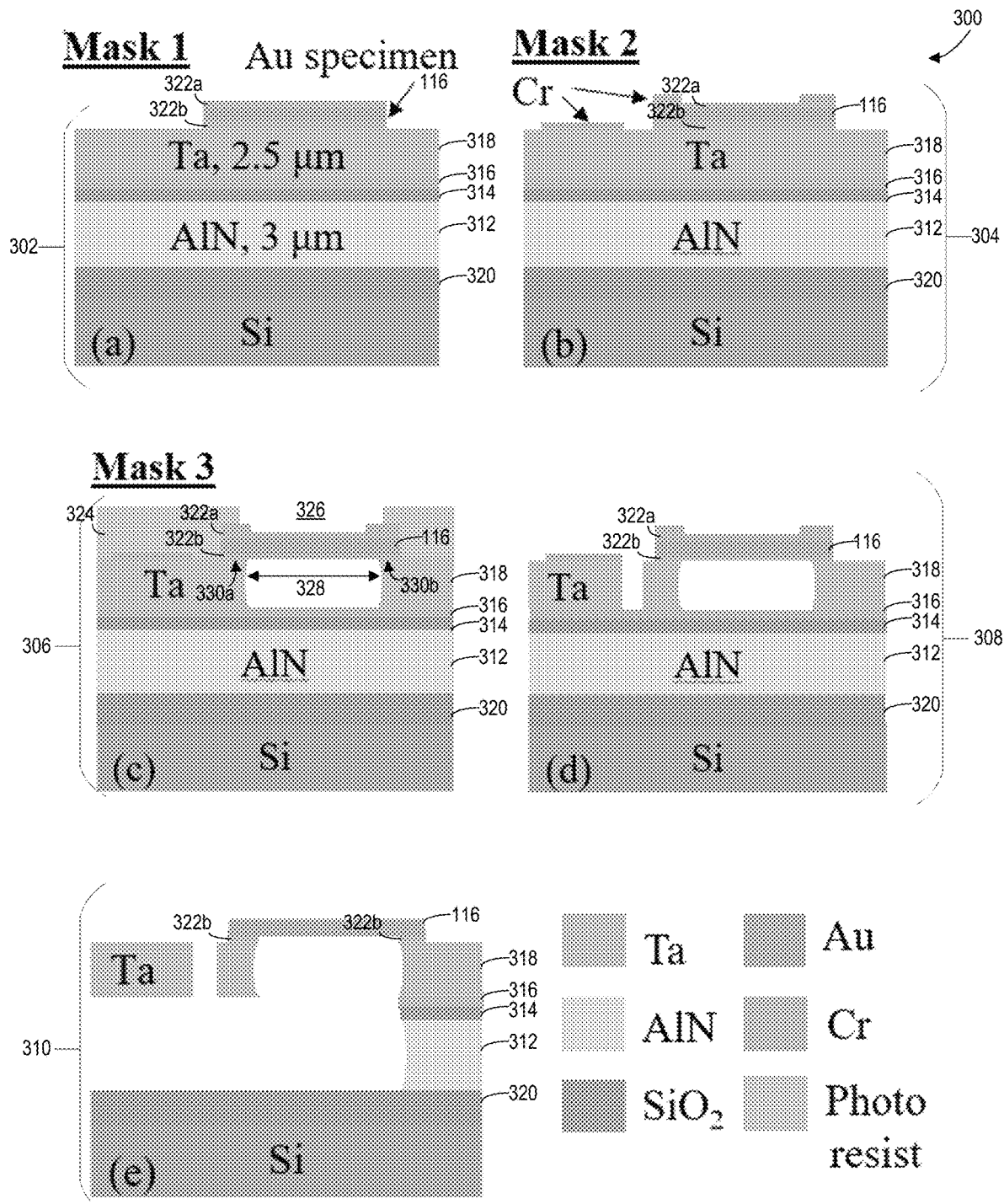
FIG. 3 illustrates an example process for fabrication of a MEMS device.

FIG. 3 shows an example process 300 for fabrication of the test platform 100 of FIGS. 1A-1B. This process 300 includes a three-mask microfabrication process flow. This represents an extension of a one mask process. This process does not incorporate a freestanding metal of a different type and different thickness from Ta. In some implementations, test platforms 100 are fabricated on a 4" silicon wafer with a 1 μm thick thermally grown oxide.

In step 302, a 3 μm thick AlN sacrificial layer 312 is reactively sputtered onto the substrate 320 (e.g., $SiO_2$). This sputtering is followed by sputter depositions of a 100 nm thick $SiO_2$ layer (labeled 314), a 90 nm thick Cr seed layer (labeled 316), and a 2.5 μm thick BCC α-Ta film (318). The thin $SiO_2$ layer 314 reduces etch residue after Ta reactive ion etch (RIE). Removal of the thin oxide layer 314 at a final release step (31) still exposes Ta to acid, but exposure time is short because the $SiO_2$ layer 314 is thin and its density is low. A photolithography step, Mask 1 (part of step 302), defines a photoresist mold 324 for the Au specimen 116. Then, 20 nm thick Cr (labeled 322b), 110 nm thick Au (labeled 116) and another 60 nm thick Cr (labeled 322a) are successively deposited and lifted off in acetone. The bottom Cr layer 322b serves as an adhesion layer. The top Cr layer 322a protects the Au specimen 116 from the following dry etch. The as-deposited Au film 116 has a grain size of 38 nm, determined by X-ray diffraction on a separately deposited Au film (shown below at Table I). The film stack to this point is shown at step 302 in process 300.

At step 304, a 60 nm thick Cr hard Mask 2 for Ta RIE is deposited and patterned by photolithography and ion milling. Next, an isotropic $XeF_2$ release step is performed for 120 cycles (30 s/cycle) to undercut the Ta below specimen and render the specimen free-standing, as seen in at step 306. $XeF_2$ selectively etches Ta but does not etch Au or Cr. $XeF_2$ accesses the Ta layer 318 below the specimen 116 through an 11 μm wide Mask 3 release window 326 patterned lithographically while Ta in other areas is covered and protected by a 450 nm thick S1805 photoresist mask. In addition to acting as a structural material, the Ta layer 318 is utilized as a sacrificial material when etched by $XeF_2$. There is no step height change at the locations 330a-b where the specimen transitions from being supported (on Ta layer 318) to being freestanding (e.g., over region 328). This, coupled in-plane alignment, enables the advantage of a uniaxial tensile specimen 116 with routine placement and excellent alignment. A height change at transition regions 330a-b would otherwise severely reduce specimen tension.

At step 308, an RIE is performed to etch through the Ta structural layer 318. While the film is thick at 2.5 μm, this etch is anisotropic and vertical sidewalls are obtained as described in PCT App. Ser. PCT/US2021/040196, filed Jul. 1, 2021 and incorporated herein by reference in entirety. The Cr seed layer 316, oxide 314, and AlN sacrificial layer 312 are selectively removed by Cr etchant 1020, buffered HF and AZ 400K developer, respectively. While the Cr layer 316 and oxide 314 are removed at room temperature, the AlN release etch is performed at 90° C. to improve etch isotropy for 30 minutes. After the AlN release, which also serves to anneal the specimen, the grain size of Au film slightly increases to 48 nm (as shown in Table 1), determined by X-ray diffraction. At step 310, critical point drying is performed to render the platform 100 free-standing.

Figure 4A:
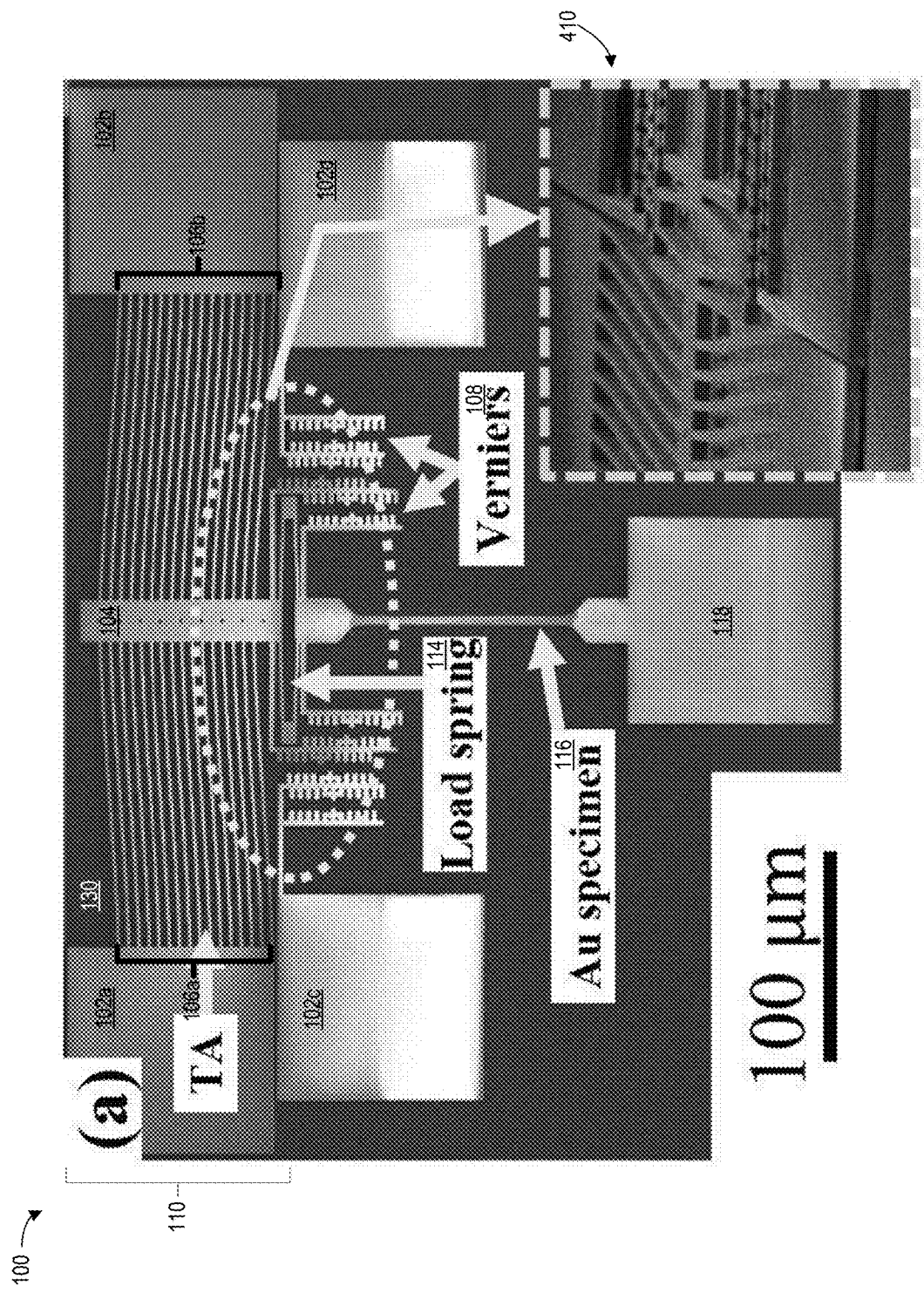
FIG. 4A illustrates an example the MEMs platform with an integrated test specimen and an inset of a side view of a portion of the MEMS platform.
Figure 4B:
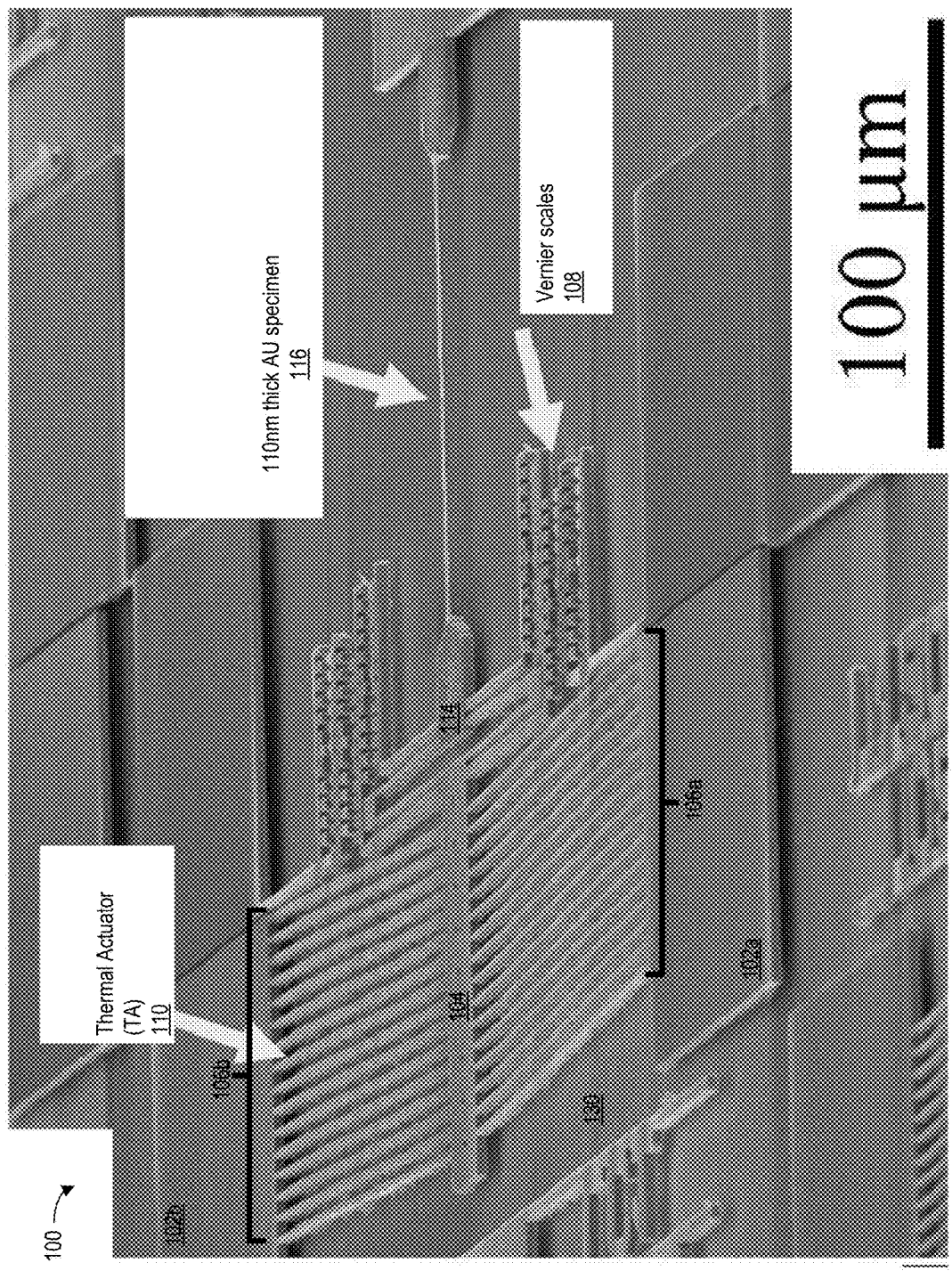
FIG. 4B illustrates a side view of the MEMS platform of FIG. 4A.

FIG. 4A shows an image of an individual fully fabricated and released platform 100, which can be fabricated based on process 300. Because the Ta structural layer is under compression upon release, the TA 100 moves forward and the load spring 114 is stretched open, as shown in inset 410. The specimen 116 is pre-stressed before testing. The entire structure of platform 100 is free standing without stiction. FIG. 4B shows a side view SEM photograph of the platform 100. If a stress gradient in the Ta structural layer exceeds a given level, the free-standing shuttle 104 may bend downward toward the substrate 130 and touch the substrate, which causes resistance to displacement by friction. Alternatively, the shuttle 104 can bend upwards, which affects the optical measurements as the Verniers may be on different focal planes, subsequently described. In the fabricated structure 100 of FIG. 4B, these effects are small for the as-released structure of the TA 110. Although the schematic in FIG. 1A shows two pairs of TA legs 106a-b, 16 leg pairs 106a-b are included in the fabricated MEMS platform 110 to increase a force output. The force output is proportional to a number of the leg pairs 106a-b. In some implementations, a plurality of chips can be fabricated at the same time. For example, twenty-four chips (integrated circuits ICs), each including 60 platform 100 instances, are co-fabricated. This enables the advantage of batch fabrication employing a full surface machining process flow. A time to complete this process flow (e.g., process 300) can be about 1 week.

TABLE 1

Parameter values for Platform 100. TB is a tensile bar (Au), LS is the load spring (Ta).

| Symbol | Description | Value | Determined by |
| --- | --- | --- | --- |
| $L_{Au}$ | TB length | 100 μm | Nominal, from layout |
| $w_{Au}$ | TB width | 4.6 μm | Nominal = 3 μm, measured by SEM (lift off mask) |
| $t_{Au}$ | TB thickness | 0.11 μm | Profilometry |
| $E_{Au}$ | TB modulus | 52 GPa | ΔT, See section IV.C |
| $k_{sp}$ | TB axial stiffness | 260 N/m | Eq. (2) |
| $L_{LS}$ | LS length | 32 or 40 μm | Nominal from layout |
| $w_{LS}$ | LS width | 1.3 μm | Nominal = 1 μm, measd. by SEM (clear field mask) |
| $L_{TA}$ | TA beam length | 150 μm | Nominal from layout |
| $O_{TA}$ | TA beam offset | 5 μm | Nominal from layout |
| $t_{Ta}$ | Ta thickness | 2.5 μm | Profilometry |
| $E_{Ta}$ | Ta modulus | 188 GPa | Nanoindentation |
| $k_{LS}$ | LS stiffness | 31.5 or 16.1 N/m | Eq. (1) |
| $d_{Au}$ | Au grain size | 38 nm | X-ray, after RT deposition |
|  |  | 48 nm | X-ray, after AlN release at 90° C. for 30 min |

The design values and example measured values for the platform 100 are now described. Design parameters of the Ta structural layer include the length and offset of the TA legs ($L_{TA}$ and $O_{TA}$, respectively) and the length and width of the load spring beam ($L_{LS}$ and $w_{LS}$, respectively), as indicated in FIG. 1A. Generally, decreasing $L_{TA}$ or increasing $O_{TA}$ raises a force output of the thermal actuator (TA) 110. However, this reduces the TA displacement for a given temperature change, ΔT. Stiffening the LS by decreasing $L_{LS}$ or increasing $w_{LS}$ increases a force applied to the specimen but reduces the load spring 114 displacement. The load spring 114 includes of two fixed-guided flexures in parallel and two in series. The load spring stiffness, $k_{LS}$, is determined based on equation (1):

$$k_{LS} = E_{Ta} t_{Ta} \left(\frac{w_{LS}}{L_{LS}}\right)^3 \quad (1)$$

where $E_{Ta}$ and $t_{Ta}$ are Young's modulus and a thickness of the Ta structural layer, respectively. $E_{Ta}$ is determined to be 188 gigapascals (GPa) by nanoindentation. A stiffness of the Au specimen, $k_{sp}$, is determined based on equation (2):

$$k_{sp} = E_{Au} \frac{w_{Au} t_{Au}}{L_{Au}} \quad (2)$$

where $E_{Au}$, $w_{Au}$, $t_{Au}$ and $L_{Au}$ are the Young's modulus, width, thickness and length of the Au specimen, respectively. A total stiffness of the load spring and specimen, k, determines a slope of the "Specimen Load Line" shown in graph 200 of FIG. 2. k is related to $k_{LS}$ and $k_{sp}$ based on equation (3):

$$\frac{1}{k} = \frac{1}{k_{LS}} + \frac{1}{k_{sp}} \quad (3)$$

Generally, if in a buckling regime, the TA 110 legs 106a-b may buckle either forward or backward, but rarely in a same direction. As a result, the shuttle 104 rotates, which introduces an additional bending moment to the specimen 116. The dimensions of the TA legs 106a-b, load spring 114, and specimen 116 are designed so that the "Specimen Load Line" intersects the linear regime of the "TA Load Line", as indicated in graph 200. Nominal and measured parameter values of the as-fabricated platform 100 (shown in FIG. 4A-4B, for example) are summarized in Table 1, previously presented. Given parameter values given in Table 1, $k_{sp}$=250 μN/μm and $k_{LS}$=31.5 or 16.1 μN/μm. $k_{sp}/k_{LS}$ is from 7.9 to 15.5, or that $k_{sp} \gg k_{LS}$. This range can be made much larger, for example by decreasing $L_{Au}$ from 100 μm to 10 μm. The force calculation is sensitive to the load spring beam width, $w_{LS}$, as $k_{LS}$ depends on $w^3$ (equation (1)). $w_{LS}$ is directly measured using SEM imaging, which is calibrated by from the pitch (line plus space) of adjacent lines. Some error may result from this measurement. The roughened sidewall due to Ta RIE may also alter the effective beam width. However, as the Young's modulus of Au measured agrees with known values, any error is shown to be negligible. Table 1 summarizes other parameter values as well.

A stress in the TA legs is determined by measuring the displacement of an unloaded TA 110, which has no specimen attached to it and thus expands freely. The stress that results in a measured displacement is then determined by a coupled electro-thermo-mechanical model, which has been successfully applied for chevron type TAs made of polysilicon and Ta. Using this model, the local stress of two unloaded TAs, each about 1 mm apart from the two tested platforms is determined to be −299 MPa and −325 MPa, respectively. These values are from two different chips. The compression ensures that the platform operates according to values in the first quadrant Q1, subsequently described.

FIGS. 5A and 5B show examples of a measurement set up 500 for performing measurements using the platform 100. The platform 100 set up 500 includes a camera 502, an objective lens 506, an LED light source 504, a hot plate 514 and a temperature controller 510. A test chip 516 is cleaved from a wafer and placed on the hotplate 514, enabling a simplified handling of thin (less than 0.5 μm thick) test specimens. A temperature is measured for the test specimen by a thermocouple. A 50× long-working distance objective 506 is used for imaging. The Vernier scales 518a-b, as observed under the 50× objective 506, are shown in FIG. 5B. During a test, the Vernier scales 518a-b are imaged (e.g., once a second). Fixed Vernier scales 518a are anchored on the substrate by a 100×100 μm pad and used as the reference for displacement measurements. Vernier scales 518b are attached to the shuttle and to the Au specimen to measure displacement. Before a test, an image is taken to record initial positions. Because displacements are referenced to the fixed Vernier scales 518a-b during a test, any specimen drift error is cancelled. This enables the advantage of drift-canceling as previously described. The shuttle and specimen displacements, $\Delta s_{sh}$ and $\Delta s_{sp}$, respectively, are extracted from the optical images using a pattern matching algorithm (data processing) with a resolution of 8 nm (+1 standard deviation measured over 4 hours at constant displacement). A difference is the load spring 114 displacement, or $\Delta s_{LS}=\Delta s_{sh}-\Delta s_{sp}$. Device 516 of FIG. 5B also indicates the specimen gripping method, which is provided by the Cr adhesion layer between the specimen and the relatively large area of the underlying Ta. This enables the advantage of strong gripping of the specimen 116, as previously discussed. The load spring 114 includes a fixed-guided beam 520.

Temperature Calibration and Young's Modulus Measurements are now discussed. Generally, for a small $\Delta T$, Young's modulus is nearly constant. Therefore, the platform 100 can be used to assess the Young's modulus of the specimen 116 material (e.g., Au), by measuring a change in its stress and strain as temperature rises. For example, if the Au film creeps during heating, the measured Young's modulus will be lower than the actual value as the measured deformation is the sum of elastic and creep deformation. A change in Young's modulus for a given nanocrystalline metal substantially affects the loading curve of that nanocrystalline metal. The test chip is first annealed at a hotplate set point of 105° C. for 4 hours. Because a heat transfer is imperfect, the tested micro-device is at a lower temperature than the hotplate. An actual temperature is obtained by measuring a displacement of an unloaded TA 110. A temperature model, subsequently described, is used to calculate the temperature that corresponds with the measured displacement.

In an example, during a test, the hotplate is re-heated to 105° C., dwells at that temperature for about 4 minutes, and then cools to room temperature. A self-actuation measurements of an unloaded TA 110, including both the heating and cooling stages, are shown in graph 600a of FIG. 6A (labeled 602 data points). At the maximum hotplate temperature of 105° C., the unloaded TA displacement is 736 nm, which corresponds to a temperature of 82° C. Hence, the temperature drop from the hotplate to the tested device is 23° C. Because the diameter of the circular hotplate is about 2.5 times a chip size (7.5×7.5 mm), and because the chip rests in the middle of the hotplate, the temperature is nearly constant at different chip locations. A displacement of another unloaded TA 110 at a different chip location than the one plotted in graph 600a measured to be 728 nm, which corresponds to 81° C. and a 1° C. temperature difference. This confirms the temperature uniformity across the chip.

The displacement 604 of the shuttle test of a platform with an Au specimen during the same thermal cycle is also shown in graph 600a, demonstrating the advantage of on-chip self-actuation previously discussed. The load spring displacement 606 and specimen displacement 608 are also shown. $E_{Au}$ is obtained by dividing the change in stress by the change in elastic strain, shown in equation (4):

$$E_{Au} = \frac{\Delta\sigma}{\Delta\varepsilon} \quad (4)$$

wherein $\Delta\sigma$ is obtained using the load spring from equation (5):

$$\Delta\sigma = \frac{k_{LS}\Delta s_{LS}}{w_{Au}t_{Au}} \quad (5)$$

A measured specimen displacement is a sum of the elastic deformation and thermal expansion. The thermal expansion is excluded to obtain a true elastic strain, which can be calculated from equation (6):

$$\Delta\varepsilon = \frac{\Delta s_{sp} - L_{tot}\alpha_{Au}\Delta T}{L_{sp}} \quad (6)$$

where $L_{tot}$=119 µm, is a total length of the specimen 116 including both a narrow gauge section and its trapezoidal shaped transition regions 522 to the two large grip ends. $\alpha$Au is the thermal expansion coefficient of Au, and is taken as 9.6 ppm/° C. which was measured for a sputtered Au film with a thickness (115 nm) and grain size (44 nm). Using a measured $\Delta s_{LS}$=531 nm and $\Delta s_{sp}$=129 nm, the specimen's Young's modulus from the heating segment is 52 GPa, which agrees with known values. The cooling segment gives a similar value of 50 GPa. Deformations of the platform and Au specimen are recovered after cooling, with measured remaining displacements of below 10 nm which are comparable to the resolution of our optical measurements. The test is therefore in the elastic regime.

Figures 6A, 6B:
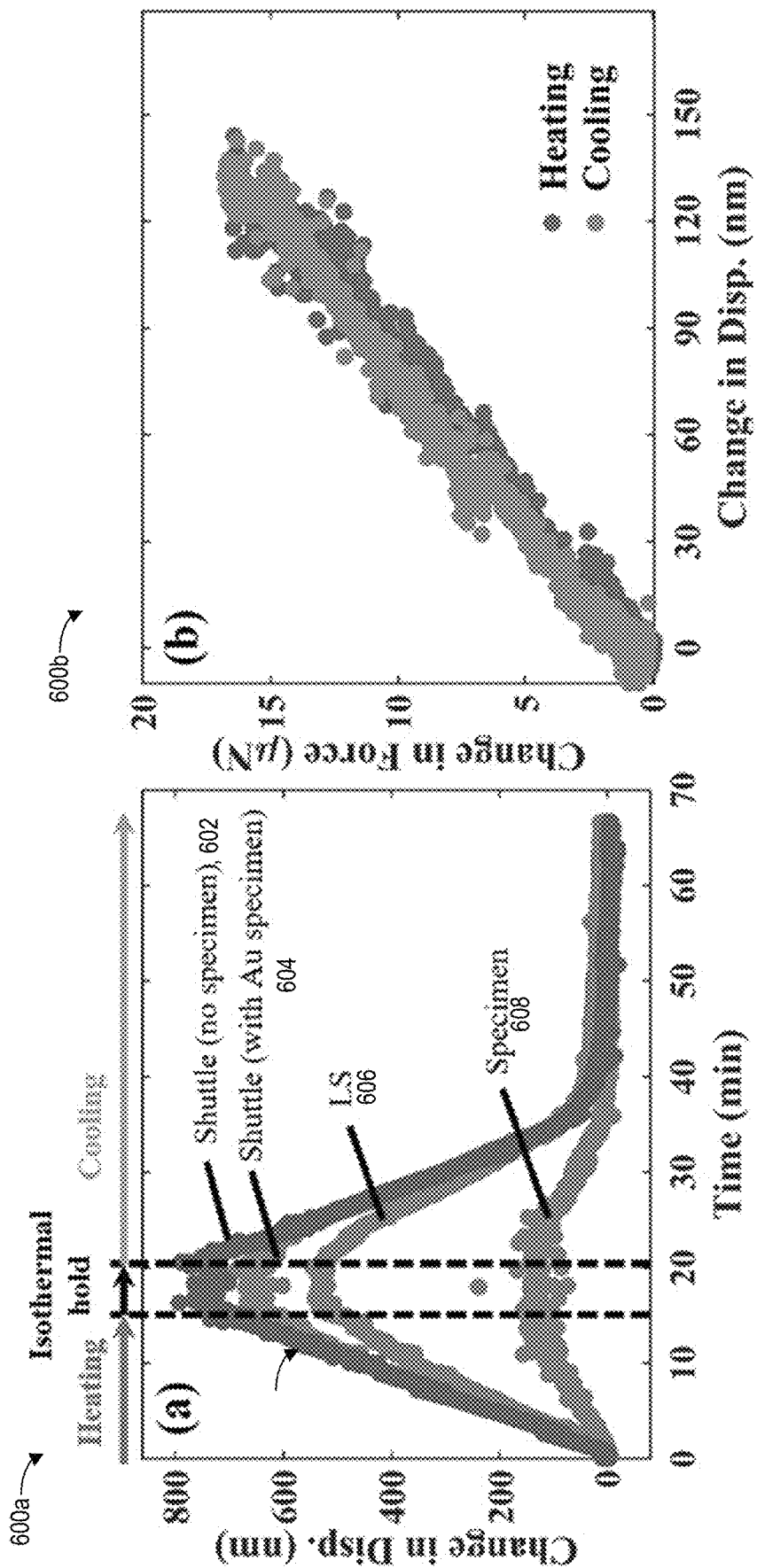
FIG. 6A illustrates a graph showing displacements by the MEMS platform of FIGS. 5A-5B.
FIG. 6B illustrates a graph showing force and displacement by the MEMS platform of FIGS. 5A-5B.

FIG. 6B shows a graph 600b that represents a change in a force applied to the Au specimen and the change in specimen displacement during heating and cooling. A linear relationship is evident, which indicates that the deformation is elastic. This is also confirmed by the similar loading and unloading Young's modulus values, as otherwise the former would reflect any creep during heating, which would decrease modulus. In contrast, during, cooling creep is minimal, and the modulus would be higher. This modulus value reflects the effective Au modulus at the end of a four hours creep measurement, subsequently described.

Creep measurement is now described. Creep tests of Au specimens are performed at the same temperature of 82° C. for 4 hours. By thermal conduction and convection, the specimen 116 is isothermal with the actuator, enabling the advantage of isothermal test conditions, previously described. In this case, the annealing prior to test was only that from the release process, which was at 90° C. for 30 minutes. Strain and stress of $L_{Au}$=100 µm specimens, measured using platforms with a stiff ($k_{LS}$=31.5 N/m) and a soft ($k_{LS}$=16.1 N/m) load springs as a function of time, are plotted in graph 700 of FIG. 7.

Figure 7:
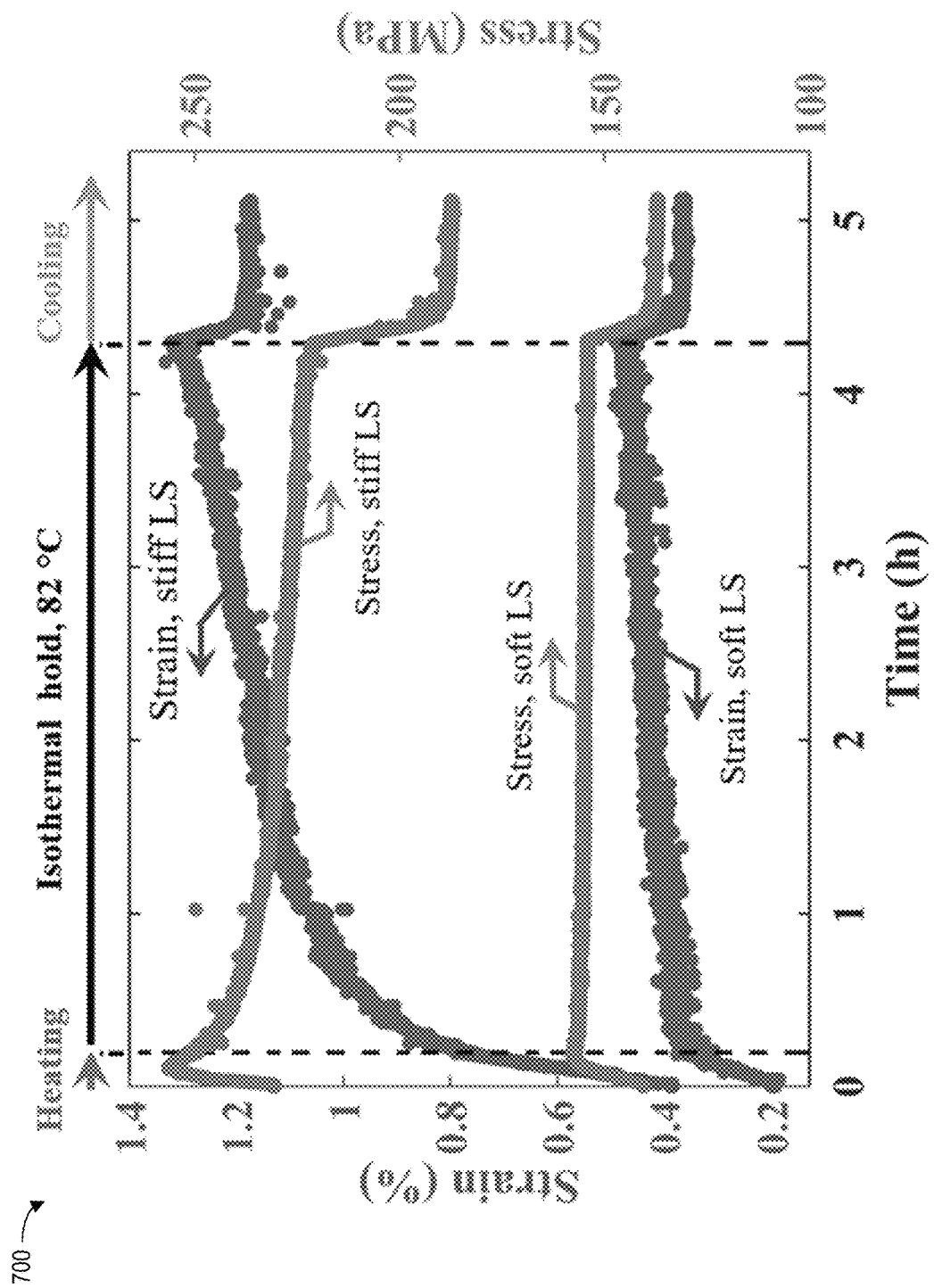
FIG. 7 illustrates a graph showing stress and strain applied to a test specimen by the MEMS platform of FIGS. 5A-5B.

In graph 700 of FIG. 7, data show that the strain is positive when the test begins because the specimens are pre-stressed by the Ta compressive stress. The pre-strain is larger for the stiffer load spring. During the heating stage, but before the temperature reaches the set point, the strain continues to increase while the stress already starts to relax for both load springs, indicative of Au creep. At the set point temperature, primary creep occurs as a gradually decreasing strain rate, especially in the stiff load spring. Upon cooling, the elastic strain is recovered while 0.78% and 0.18% creep strains are not recovered for the stiff and soft LS, respectively.

An almost constant strain rate is achieved at $1.8\times10^{-7}$ s$^{-1}$ after about 1.5 h for the stiff LS. Strictly, this is not steady-state creep because although the strain rate is constant, the stress is decreasing. For the stiff load spring, from 1.5 to 4 hours, the stress decreases from 231 MPa to 223 MPa. If the Au film exhibits power law creep with an exponent of 3, a decrease in the creep rate of 1−(223/231)$^3$=10% would be expected over this time interval. Because primary creep may not be exhausted, the value of ε'=1.8×10$^{-7}$ s$^{-1}$ is an upper bound estimate of the creep rate at 223 MPa.

A constant strain rate is attained at 7.3×10$^{-8}$ s$^{-1}$ after about 0.5 hours for the soft load spring. Here the stress is nearly constant at 155 MPa (decreasing by 1.3%, from 156 MPa to 154 MPa) over 3.5 h, and hence ε'=7.3×10$^{-8}$ s$^{-1}$ closely approaches the true steady state rate. Even though stress is always relaxing, the microstructure may be able to follow the slow relaxation rate to achieve an equilibrium of dislocation generation and annihilation rates.

Figure 8B:
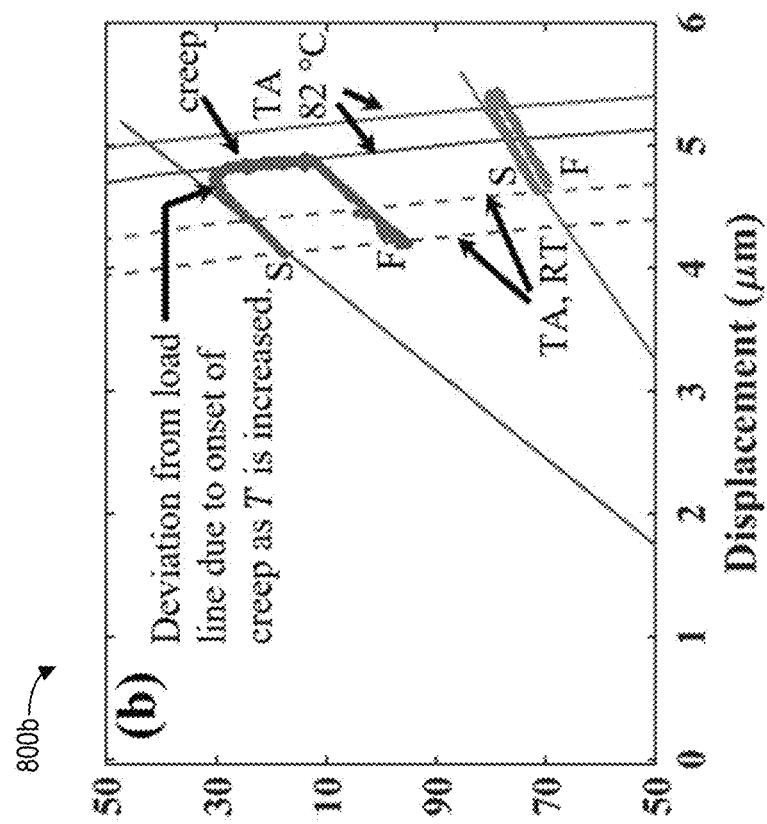
FIGS. 8A-8B each illustrate a graph showing displacement and force for a MEMS platform.
Figure 8A:
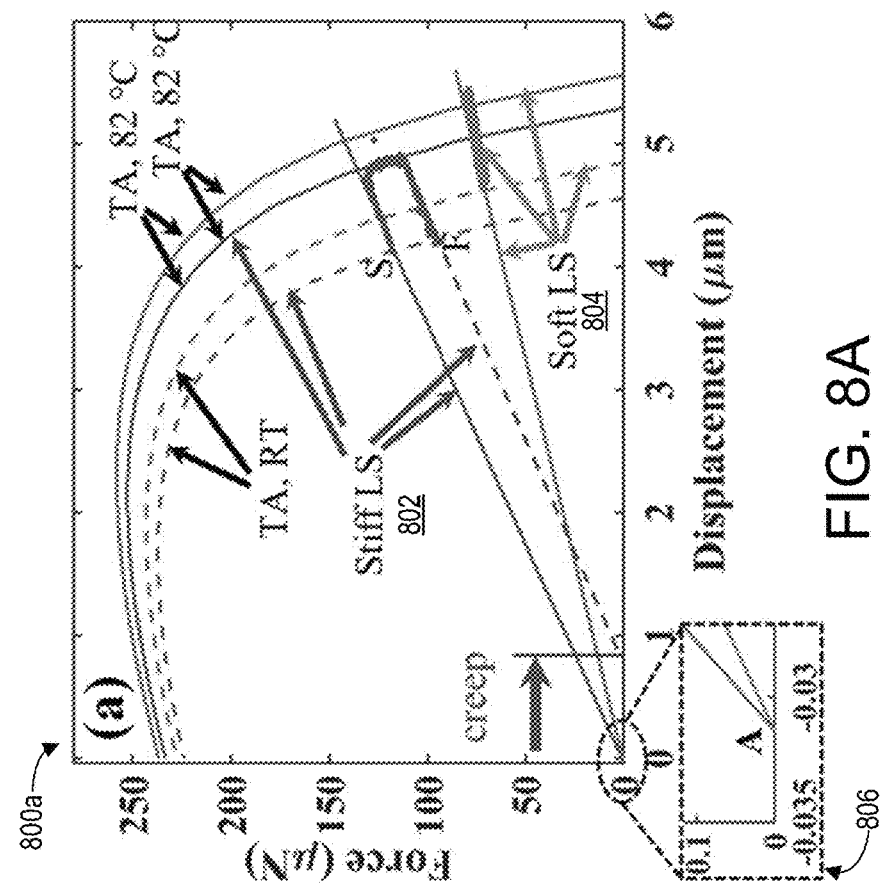

As previously described, steady state creep is attained in an analogous configuration in bulk specimens. The measured force and displacement during the creep tests are plotted in FIGS. 8A-8B in graphs 800a and 800b, along with modeling results. In graph 800a of FIG. 8A, the dark curves 802 are for the stiff load spring and the light curves 804 are for the soft LS. The TA curves do not overlap for the stiff and soft load springs because respective local Ta residual stresses are different. The specimen load lines do not cross the origin shown in inset 806 of graph 800a. As the Au film has a uniaxial residual tensile stress of 16.3 MPa, which is determined by wafer curvature measurement on a separately deposited film and corresponds to a specimen contraction of about 31 nm at zero force (point A). Referring to graph 800b of FIG. 8B, the stiff LS data begins at S (start). As temperature rises, it initially follows the stiff LS load line. Then, as primary creep sets in, it deviates from the load line (these specimens were annealed at 90° C. during the AlN release). Once the test temperature of 82° C. is reached, the Au specimen creeps. The specimen 116 is therefore elongating, and the associated creep displacement is determined by extending a line of slope equal to $k_{LS}$ back to the abscissa. At T=82° C., the force-displacement curve follows the solid TA model line as it accurately models the stiffness of the TA legs. Because T decreases relatively quickly after the 4 hour test, and because creep decreases rapidly with T, the data follow the load line as T decreases to room temperature, as represented by the dashed green line which has a slope equal to kL S as well. The total creep is shown by the thick green arrow near the origin in graph 800a to be about 0.8 µm, or 0.8%, substantially larger than a pure stress relaxation technique in which grips are fixed and hence limited to elastic strain of ~0.2%. This enables the advantage of a large strain test range, previously discussed. In graph 800b, for the soft load spring, during the creep stage that involves substantially less creep than for the stiff load spring, the data does not follow load line as well. However, the 4 hour elapsed time is relatively small considering the very slow creep rate, and hence the total creep displacement is small. During the experiment, the operator refocuses the optical microscope approximately every 15 minutes because the objective to specimen working distance changes during the experiment (e.g., due to changes in laboratory ambient temperature). Automating this focusing procedure can be performed.

The measured creep rate, ε'=1.8×10$^{-7}$ s$^{-1}$ at 82° C. and 225 MPa, is a factor of 13 lower than the steady state value of 2.3×10$^{-6}$ s$^{-1}$ reported at 80° C. and 100 MPa in conventional approaches. Comparing to conventional approaches, from which a creep rate of 5×10$^{-7}$ s$^{-1}$ at 82° C. and 225 MPa can be inferred, the platform shows a rate that is factor of two lower and confirms that the grips are strong.

A number of metals can be tested using platform 100. The advantage of testing a wide variety of metals can extended by incorporating a protective layer on the stack of the platform. The process flow 300 is compatible with a wide variety of metals. Ta, Ti, V, Nb, W and Mo are etched by XeF$_2$, and Al is etched by KOH. A conformal atomic layer deposited (ALD) Al$_2$O$_3$ can be used to protect the specimen from XeF$_2$. Al$_2$O$_3$ is resistant to XeF$_2$ and can be removed by KOH in the final release step. This expands the compatibility of the process flow to a wide variety of metallic films (e.g. excepting Al).

The platform is configured to test the metals over a wide temperature range. This is due to a low creep of the refractory metal Ta at moderate temperatures. Hardness, grain size and microstructure of α-Ta remain stable after anneal up to 1000° C. [27]. A much higher change in temperature ΔT than 60° C. is attainable. The linear part of "TA Load Line" graphs 800a-b can shift far further to the right. A rough calculation for the shift is 1 µm per 100° C. which would correspond to a free displacement increasing from 4.5 µm to 11.5 µm for a ΔT=700° C., where the homologous temperature of Ta is (973/3290)=0.30. The wide range of temperature change (up to 800° C.) can prove useful for high temperature thin film mechanical property testing. In air, the test temperature may be limited by Ta oxidation which starts at ~100° C. Higher temperature is possible if a vacuum chamber or a reducing environment is used for the testing environment. Minimal Ta oxidation was observed in high vacuum (2×10$^5$ Torr) after anneal at 750° C. In some implementations, the platform 100 can be cooled to less than 0° C. (such as to −100° C. or cooler) to test the specimen under low temperatures. This can be part of a cryoelectronmicroscopy analysis.

Generally, the platform utilizes a chevron type TA with a CTE larger than that of the silicon substrate to apply a load, vernier scales to measure displacement optically and a load spring to calculate the output force. α-Ta is chosen as the structural material due to its combined properties of high CTF, large hardness, its thermal stability and the ability to dry etch a 2.5 µm thick film anisotropically. The compressive residual stress is controllable to ensure a uniaxial tensile test in Q1 of graph 200. A new surface micromachining process flow is demonstrated to fabricate free-standing platform. α-Ta serves as a sacrificial material under the specimen to ensure out-of-plane alignment, and as the structural material. AlN serves as a sacrificial material to release the α-Ta. Specimens are co-fabricated and tested without the need of manipulation. Batch processing enables high throughput sample preparation. A 110 nm thick Au specimen is used to demonstrate the platform. A Young's modulus of 52 GPa is measured. Creep tests are performed for the Au specimen at 82° C. The creep rate is lower than that of 1750 nm and 200 nm thick films at the same temperature and comparable stress.

Figures 9A, 9B, 9C:
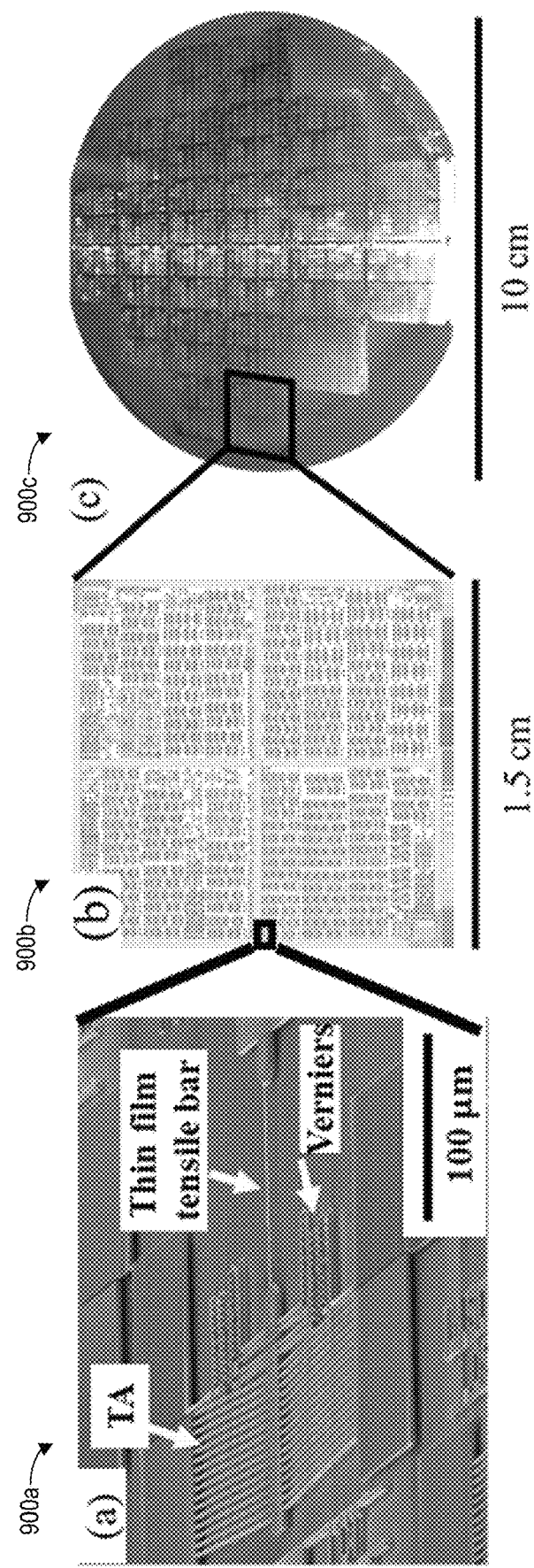
FIGS. 9A-9C show an example configuration of a layout of a MEMS platform on a wafer for fabrication.

FIGS. 9A, 9B, and 9C show a fabrication layout for producing the platform 100 in bulk on wafers. FIG. 9A shows a layout 900a of a chip with over sixty combinations of various TA and LS geometries. FIG. 9B shows a portion of a wafer layout 900b including a 4-inch silicon wafer with 24 chips after batch fabrication. FIG. 9C shows a position of the portion 900b on a wafer 900c.

The processes described herein avoid introduction of defects due to focused ion beam milling. These defects would reduce the material yield strength and affect other properties. The processes described herein avoid a second artifact that occurs from using hydrofluoric (HF) acid to remove a silicon oxide "sacrificial" material surrounding the tensile bar. HF embrittles metals or enhances metal plastic deformation. The nanofabrication processes described herein (e.g., process 300, 1000, 1200, etc.) for the platform 100 of FIG. 1A exposes the specimen only to a gentle gas (XeF$_2$) and base (KOH). There is no damage incurred to the film. The XeF$_2$ gas is used to etch the Ta under the specimen creating feature 328 in FIG. 3. This is very useful because there is no step in the film when crossing from the supported to the supported region. Such as step would other require more displacement to be applied to the tensile bar due to the step compliance. The use of AlN as a sacrificial material enables use of the KOH base.

In some implementations, about 10,000 micro-instruments (e.g., platform 100 instances) are made together on a 4 inch silicon wafer. Given this large number and the ease of testing, high throughput is attainable. Specimens can be made by sputtering, evaporation, electrodeposition or laser ablation. The specimen need not be etched because a liftoff method is used to deposit it. In addition to tensile bars, specimens of different geometries can be made simply by changing the mask layout. For example, stress-concentrating notches can be included from which cracks will develop when subject to fatigue. Vernier scales previously described are tracked under an optical or electron microscope and automated image processing provides accurate stress-strain curves. Creep is accurately measured because one of the Vernier scales is attached to the substrate so that drift is canceled, as previously described.

As previously described, a reason for developing structural tantalum Ta is that it is a refractory metal with a high coefficient of thermal expansion. A second means to provide actuation force is thereby simply to raise the chip temperature. This makes otherwise difficult creep measurements simple. The platform can control Ta's residual stress to be compressive, thereby additionally creating a third, passive, actuation mechanism.

The creep for nanocrystalline metals is understood using the platform, as previously described. Nanocrystalline metals are tested for high strength behavior, but these are susceptible grain boundary-induced creep. Because tantalum is refractory with a high melting temperature, Tm, of 3290 K, it will not creep below Tm/3 or ~800° C. The standard actuator material in micromachining is polycrystalline silicon, for which Tm/3 is ~300° C., and which will not self-actuate if built on a standard silicon wafer.

Figure 10:
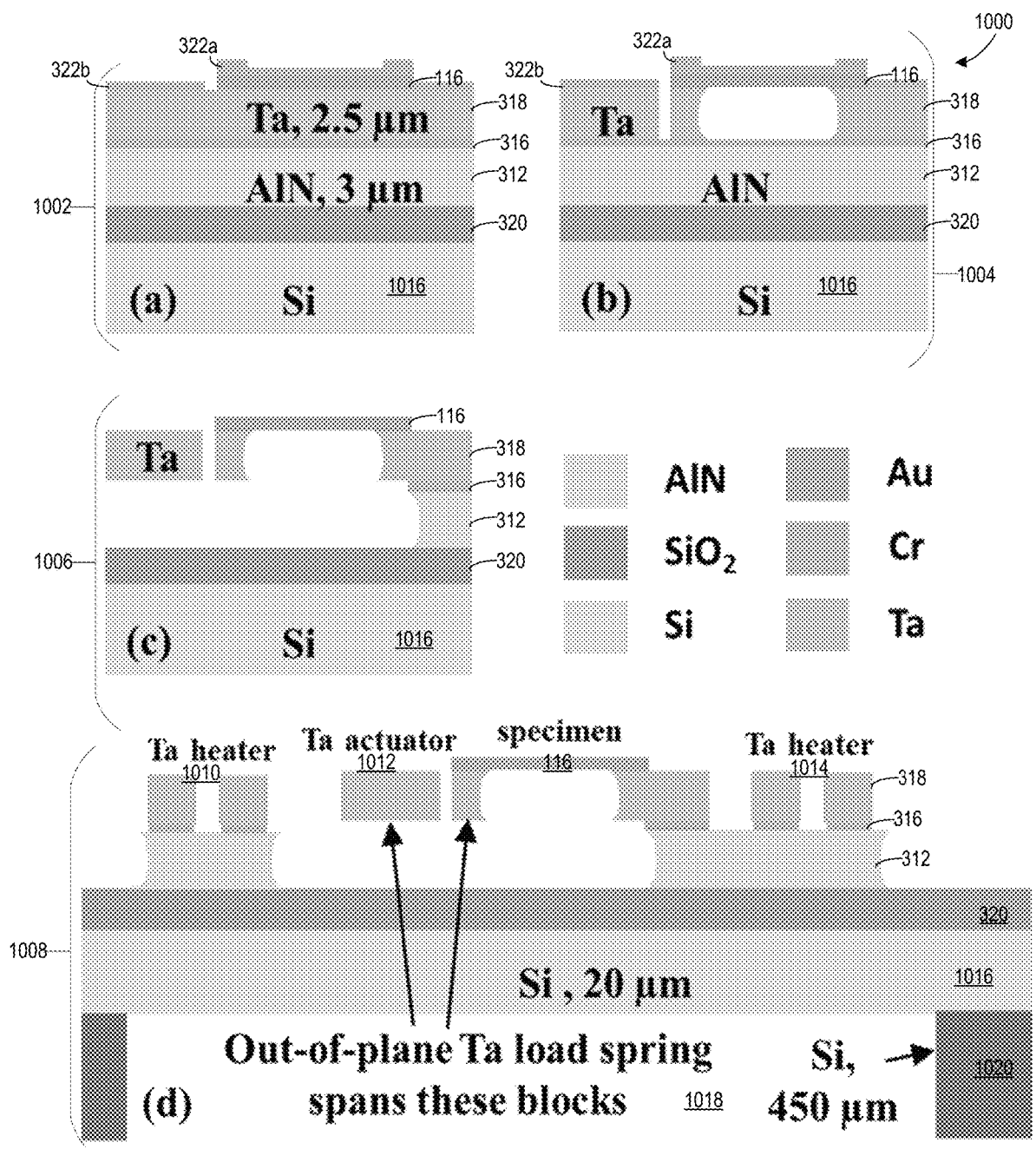
FIG. 10 shows an example process for fabrication of a MEMS device.

FIG. 10 shows an example process flow 1000 for producing a platform. Process flow 1000 can be similar to process flow 300 previously described. In step 1002, sequential AlN layer 312, SiO$_2$ layer 320 (reduces Ta etch residue), Cr layer 316, and Ta layer 318 deposition on thermal oxide wafer 1016. There is a Cr hard mask 322a-b deposition and pattern. Step 1004 shows XeF$_2$ release based on the masking of the hard layer. Step 1006 shows a release etch and critical point drying. Step 1008 shows an adjacent region 1010 showing Ta heater and region 1014 showing a Ta heater. A backside etch region 1018 with thin silicon area to enable rapid heating while rapid cooling is accomplished because silicon is thick in surrounding region 1020.

Figure 11:
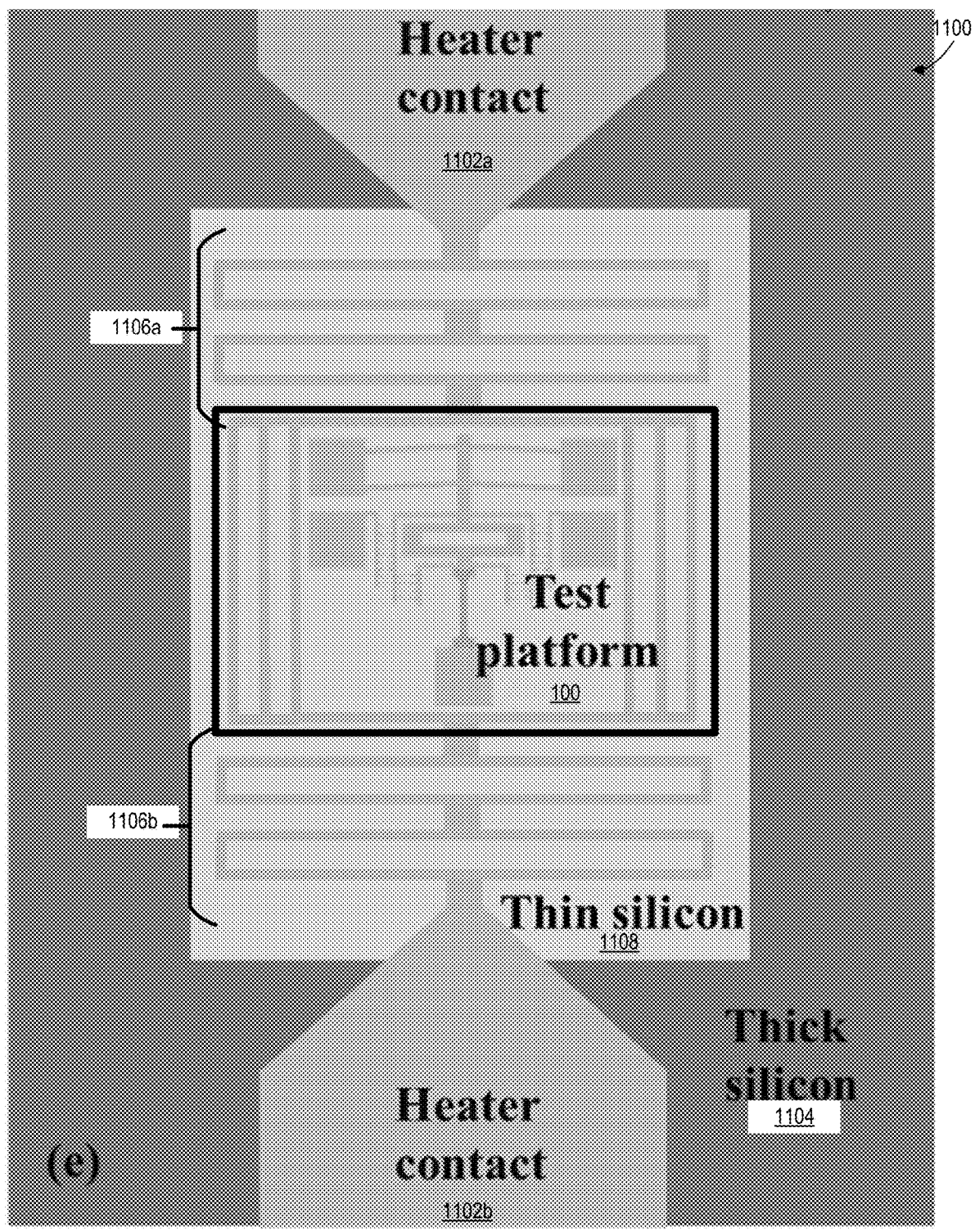
FIG. 11 shows an example top view of a MEMS device fabricated by the process of FIG. 10.

FIG. 11 shows a top view of the device 1100 generated by process 1000. The device 1100 includes the platform 100 described herein, demarcated by a box. The platform can be connected to heater regions 1106a-b, which have contacts 1102a-b. A thick silicon layer 1104 supports the device 1100, while a thin silicon laver 1108 enables rapid heating of the platform 100. A similar embodiment with all silicon and SiO$_2$ removed (e.g., at thin silicon layer region 1108 under the test specimen is also possible for in-situ transmission electron microscopy.

The platform can be configured for independently controlled force and velocity for strain rate experiments. These features have been shown in previous papers for polysilicon actuators, and are mentioned in the disclosure for the tantalum actuators.

The device 1100 enables in-situ transmission electron microscopy (TEM), as can be accomplished by etching a through hole in the silicon wafer. This enables a user to directly observe texture and defects such as dislocations, twinning, grain growth, grain rotation and grain sliding, all of which contribute to irreversible or plastic deformation, and which can limit material life. Measurements under an optical microscope can be made to characterize behavior, and subsequently conduct in-situ TEM to determine mechanisms. Temperature control in vacuum is best accomplished with an on-chip heater, which is co-fabricated as previously described.

Figure 12:
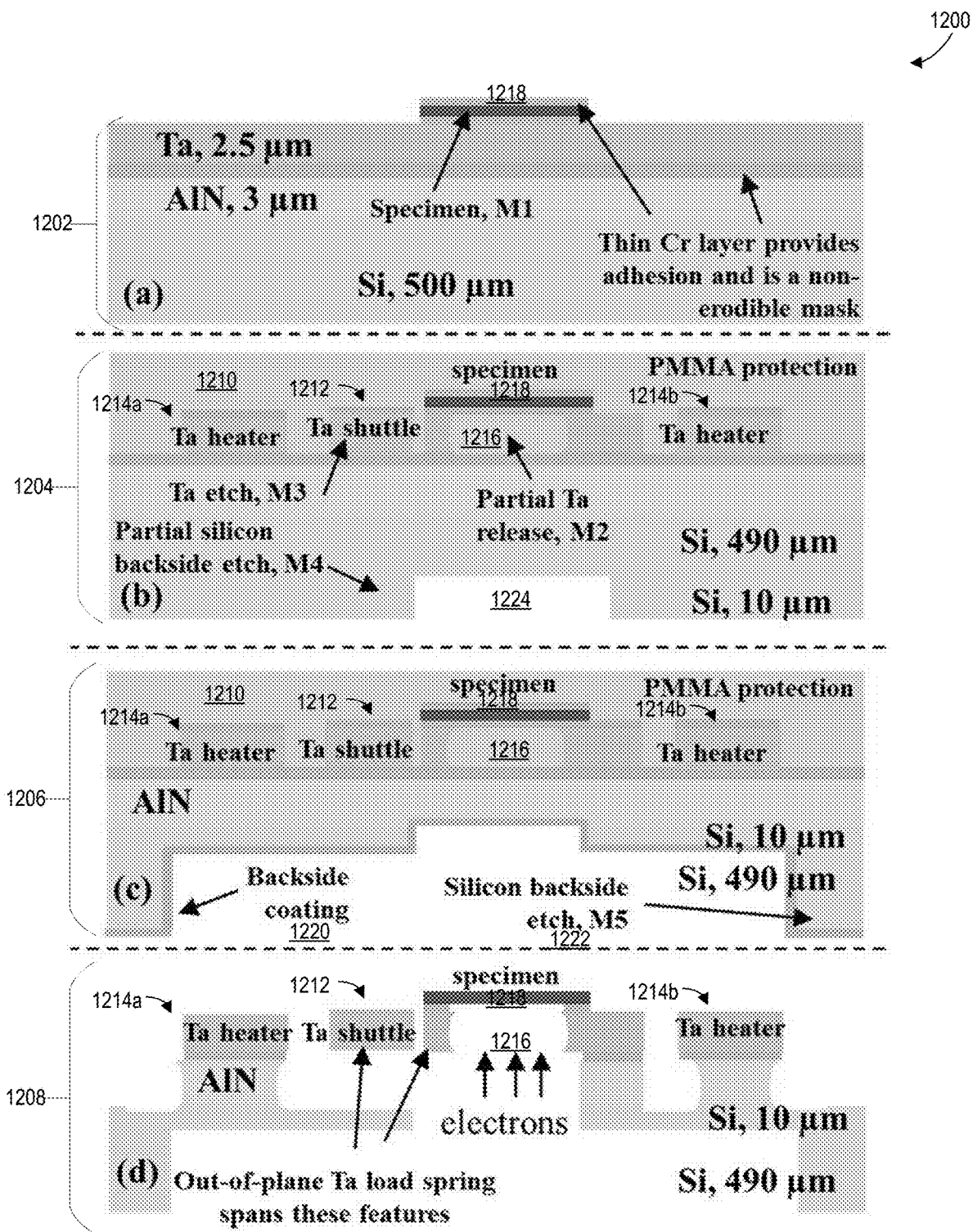
FIG. 12 shows an example process for fabrication of a MEMS device.

FIG. 12 shows a process 1200 for a process flow for the test platform (e.g., platform 100). The process flow 1200 chemically represents the process flow. The previously developed flow. The process flow includes Masks 1-3 (M1 at step 1202, M2 & M3 at step 1204). M4 and M5 in steps 1204 and step 1206, respectively, involve wafer backside processing after a protective PMMA layer coats the front side. Through-wafer etching is a routine process in the CMU nanofabrication facility. However, the AlN release etch at step 1208 uses KOH, which generates hydrogen, which in turn attacks metals and ceramics. To prevent silicon from being etched during AlN release as in step 1208, different coatings applied to the backside are applied.

Step 1202 shows a specimen on top of a Ta later (2.5 μm thick), an AlN later (3 μm thick), and a silicon later (500 μm thick), A thin Cr layer can be placed in the stack between the Ta and AlN layers. The Cr layer can provide adhesion and is a non-erodible mask.

Step 1204 shows a PMMA protection layer 1210, There is partial Ta release at region 1216 based on mask M2 under the specimen 1218. A Ta shuttle 1212 is shown based on a Ta etch with mask M3. Ta heaters 1214a-b are formed by mask M3 by Ta etch. A partial backside Si etch at region 1224 provides a window for TEM observations, described previously.

Step 1206 shows a backside coating 1220 and a backside etch 1222 applied to the silicon layer under the platform. This creates a thin silicon layer portion (10 μm thick) and a thick silicon layer region (490 μm thick), as previously described.

Step 1208 shows a final configuration of the platform that enables electrons of the TEM to reach the specimen 1218. The Ta heaters 1214a-b are formed and the Ta shuttle 1212 (similar to shuttle 104) is formed as a free-standing element. The out-of-plane Ta load spans the shuttle 1212 and specimen 1218 support.

Figure 13:
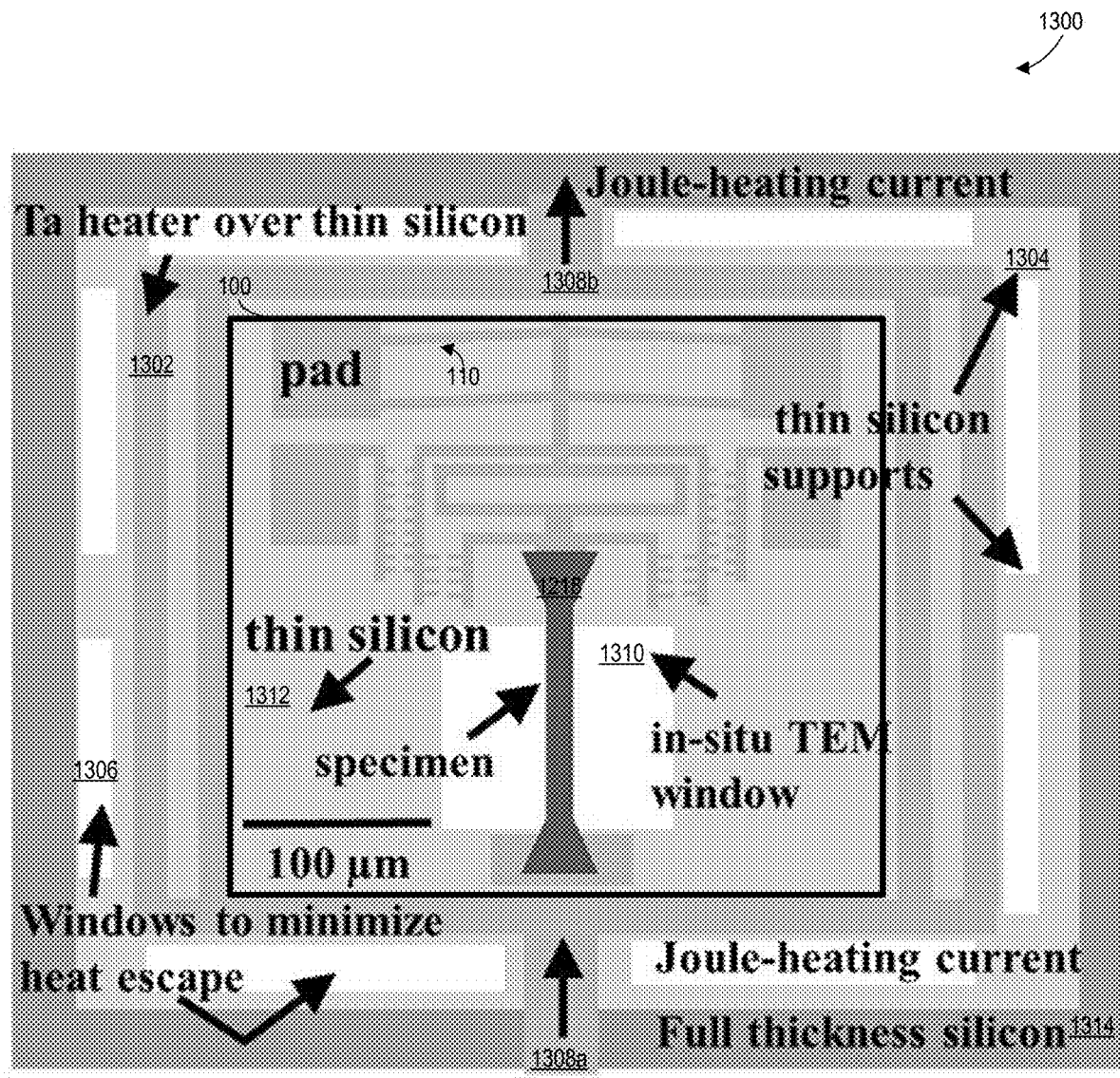
FIG. 13 shows an example top view of a MEMS device fabricated by the process of FIG. 12.

FIG. 13 shows resulting structure 1300 of process 1200 from a top view. Joule heating of the thin area 1312 surrounding the specimen 1218 that enables temperature control in vacuum. The Ta heater 1302 includes heaters 1214a-b of FIG. 12. The heat generated in the Ta heaters 1302 readily transfer to the specimen 1218 as silicon is an excellent thermal conductor. M4 and M5 are based on a heat transfer analysis using the finite element method identifying tradeoffs with respect to thickness of the thin silicon area 1312 versus heat lost to the thicker substrate 1314, with the objective of efficient heating while attaining an isothermal specimen condition. The platform 100 previously described is in the heater 1302, A current flows from connector 1308a to 1308b for heating the heater 1302. Windows 1306 from masks M4, M5 minimize heat escape. A window 1310 enables in-situ TEM analysis. Thin Si supports 1304 are used to attach the thin silicon 1312 to the thick silicon 1314.

In some implementations, the micro-instrument processing of process 1200, as shown in FIG. 12, is done at wafer scale. This includes the final AlN release step 1208. Silicon pieces can be cut manually with a diamond scribing tool. There is a procedure for ensuring silicon pieces are routinely and appropriately sized for the TEM specimen holder. The heater current is provided through standard TEM specimen holders. Two different currents are controlled. A first current heats the specimen 1218, while a second current provides actuation force to the TAs 110. Such specimen holders are standard.

The process 1200 can accommodate a range of specimen types, materials and deposition methods. For specimen metals that are etched by the $XeF_2$ etch mentioned above, the sidewalls are coated with $Al_2O_3$ atomic layer deposition (ALD). Better control of Ta residual stress and thru-film stress gradient will enable longer shuttles 1212 and hence higher force via more legs and minimization of heat transfer to the specimen 1218. Electrodeposition is widely used in thin film processes, and the process flow can be adapted to accommodate this method. The process 1200 can include deposition and testing of ceramic, phase change, and piezoelectric materials. Specimens are designed to be compatible with other test methods such as membrane, cantilever or bent beam deflection, blister testing, and laser Doppler vibrometry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

What is claimed is:

1. A micro-electromechanical system (MEMS) test platform, comprising:
   a substrate;
   a Tantalum (Ta) layer comprising a movable structure and a fixed portion, the movable structure being suspended over the substrate and configured to move relative to the substrate, and the fixed portion of the Ta layer being coupled to the substrate and fixed in place relative to the substrate; and
   a test specimen comprising a first portion coupled to the movable structure and a second portion coupled to the fixed portion of the Ta layer, the movable structure configured apply a force to the test specimen when a shuttle of the Ta layer structure moves relative to the substrate.

2. The MEMS test platform of claim 1, wherein the force comprises a displacement-inducted force on the test specimen.

3. The MEMS test platform of claim 1, further comprising:
   a sacrificial layer between the substrate and the Tantalum layer, wherein a first portion of the sacrificial layer is etched away to release the first portion from the substrate, and wherein a second portion of the sacrificial layer remains and couples the substrate to the Tantalum layer.

4. The MEMS test platform of claim 3, wherein the sacrificial layer comprises Aluminum Nitride (AlN), Copper (Cu), or Silicon Oxide ($SiO_2$).

5. The MEMS test platform of claim 1, wherein the first portion comprises etched Tantalum, and wherein a sidewall profile of the etched Tantalum comprises approximately zero lateral etch or an etch angle between 85-90° C.

6. The MEMS test platform of claim 1, the movable structure comprising:
   a plurality of legs extending from a first side of the substrate or a second side of the substrate to connect at a shuttle, the plurality of legs being coupled to the substrate at the first and second sides, wherein the plurality of legs are configured to support an in-plane movement of the shuttle.

7. The MEMS test platform of claim 6, wherein at least one leg of the plurality of legs are each between 1-2.5 micrometers (µms) thick, and wherein each of the plurality of legs have an approximately equal thickness.

8. The MEMS test platform of claim 6, wherein the movable structure comprises a load spring in series with the shuttle, the load spring configured to provide an approximately constant load condition on the test specimen when the movable structure is not actuated.

9. The MEMS test platform of claim 1, wherein the movable structure is actuated by application of an electrical current through the movable structure and the test specimen.

10. The MEMS test platform of claim 1, wherein the movable structure is actuated by heating the movable structure and the test specimen.

11. The MEMS test platform of claim 1, wherein the movable structure is configured to move up to 10 µm relative to the substrate responsive to an electrical or thermal input.

12. The MEMS test platform of claim 1, wherein an isotropic release etching of a sacrificial layer comprising AlN is between 60° C.-90° C.

13. The MEMS test platform of claim 1, wherein the Tantalum layer comprises α-Tantalum.

14. The MEMS test platform of claim 1, wherein the test specimen comprises a metal, metal alloy or ceramic.

15. The MEMS test platform of claim 1, wherein the test specimen comprises a ceramic.

16. The MEMS test platform of claim 1, wherein the movable structure is heatable up to 800° C. and coolable to −150° C., the approximated Ta ductile to brittle transition temperature, to control the force on the test specimen.

17. The MEMS test platform of claim 1, further comprising an atomic layer deposition of $Al_2O_3$ configured to provide oxidation resistance.

18. The MEMS test platform of claim 1, further comprising a window in the substrate, the window configured to enable in-situ transmission electron microscopy (TEM) of the test specimen during actuation of the movable structure.

19. The MEMS test platform of claim 1, further comprising a heating structure formed from the Ta layer, the heating structure coupled to the movable structure for actuation of the movable structure.

20. A silicon wafer comprising at least 1000 instances of the MEMS test platform of claim 1 configured for batch fabrication, wherein each instance of the MEMS test platform is removable for performing testing of a corresponding instance of the test specimen.

\* \* \* \* \*

UNITED STATES PATENT AND TRADEMARK OFFICE
CERTIFICATE OF CORRECTION

PATENT NO. : 12,469,673 B2
APPLICATION NO. : 18/082543
DATED : November 11, 2025
INVENTOR(S) : Maarten de Boer and Longchang Ni Page 1 of 1

It is certified that error appears in the above-identified patent and that said Letters Patent is hereby corrected as shown below:

In the Claims

Column 20, Line 33, in Claim 4, delete "(AIN)," and insert -- (AlN), --

Column 20, Line 67, in Claim 12, delete "AIN" and insert -- AlN --

Signed and Sealed this
Thirtieth Day of December, 2025

John A. Squires
*Director of the United States Patent and Trademark Office*